US011783859B2

(12) United States Patent
Kataoka

(10) Patent No.: US 11,783,859 B2
(45) Date of Patent: Oct. 10, 2023

(54) NONCONTACT COMMUNICATION MEDIUM, MAGNETIC TAPE CARTRIDGE, METHOD FOR OPERATING NONCONTACT COMMUNICATION MEDIUM, AND PROGRAM

(71) Applicant: FUJIFILM CORPORATION, Tokyo (JP)

(72) Inventor: Eiichiro Kataoka, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 18/056,719

(22) Filed: Nov. 18, 2022

(65) Prior Publication Data

US 2023/0084471 A1 Mar. 16, 2023

Related U.S. Application Data

(63) Continuation of application No. PCT/JP2021/018100, filed on May 12, 2021.

(30) Foreign Application Priority Data

May 25, 2020 (JP) ................................. 2020-090929

(51) Int. Cl.
G11B 23/107 (2006.01)
G11B 5/02 (2006.01)
G11B 20/00 (2006.01)

(52) U.S. Cl.
CPC ............. *G11B 23/107* (2013.01); *G11B 5/02* (2013.01); *G11B 20/0092* (2013.01)

(58) Field of Classification Search
None
See application file for complete search history.

(56) References Cited

U.S. PATENT DOCUMENTS 6,005,735 A * 12/1999 Gleim .................. H02H 7/0833
360/75
6,289,169 B1 * 9/2001 Okuyama ............ H04N 21/434
348/E5.005

(Continued)

FOREIGN PATENT DOCUMENTS

CN          1163457 A  * 10/1997 ......... G11B 20/1205
JP       2002-352554 A    12/2002
(Continued)

OTHER PUBLICATIONS

JP 2008117442 A—English Translation—Published May 22, 2008 (Year: 2008).*

(Continued)

*Primary Examiner* — William J Klimowicz
(74) *Attorney, Agent, or Firm* — SOLARIS Intellectual Property Group, PLLC

(57) ABSTRACT

A noncontact communication medium includes a processor, and a memory incorporated in or connected to the processor, and performs noncontact communication with an external communication device. The memory has a storage block where information regarding an attribute of the noncontact communication medium is stored and that includes a plurality of storage fields. The plurality of storage fields include a specification-independent storage field where information independent of a specification of a magnetic tape cartridge, in which the noncontact communication medium is mounted, is stored. The processor is configured to write accompanying information regarding the magnetic tape cartridge in the specification-independent storage field in response to an instruction given from the external communication device to the noncontact communication medium by the noncontact communication.

14 Claims, 26 Drawing Sheets

(56) References Cited

U.S. PATENT DOCUMENTS

| | | | |
|---|---|---|---|
| 9,640,209 B1* | 5/2017 | Bui | G11B 20/1816 |
| 10,475,477 B1* | 11/2019 | Biskeborn | G11B 5/00813 |
| 11,341,994 B1* | 5/2022 | Goker | G11B 5/40 |
| 2005/0283671 A1* | 12/2005 | Stave | G11C 29/1201 |
| | | | 714/31 |
| 2006/0285240 A1* | 12/2006 | Jurneke | G11B 15/06 |
| 2009/0323218 A1* | 12/2009 | Thompson | G11B 15/689 |
| | | | 360/93 |
| 2011/0176238 A1* | 7/2011 | Shiratori | G11B 27/107 |
| 2021/0012804 A1* | 1/2021 | Nakashio | G06K 19/04 |
| 2021/0027803 A1 | 1/2021 | Adachi et al. | |
| 2021/0088977 A1* | 3/2021 | Lindich | G11B 3/007 |
| 2021/0233567 A1* | 7/2021 | Tochikubo | G11B 23/30 |
| 2021/0241062 A1* | 8/2021 | Kataoka | G06K 19/0723 |
| 2021/0241788 A1 | 8/2021 | Adachi et al. | |
| 2021/0241794 A1* | 8/2021 | Kataoka | G11B 5/00813 |
| 2021/0242905 A1* | 8/2021 | Kataoka | H04B 5/0037 |
| 2021/0242906 A1* | 8/2021 | Kataoka | H02J 50/005 |
| 2021/0375317 A1* | 12/2021 | Nakano | G11B 23/087 |
| 2022/0254370 A1* | 8/2022 | Yamaga | G11B 5/00813 |
| 2023/0084471 A1* | 3/2023 | Kataoka | G11B 20/0092 |
| | | | 360/132 |

FOREIGN PATENT DOCUMENTS

| | | | | |
|---|---|---|---|---|
| JP | 2008-117442 A | | 5/2008 | |
| JP | 2009-230504 A | | 10/2009 | |
| JP | 2010-015461 A | | 1/2010 | |
| JP | 2019046522 A | * | 3/2019 | G06F 11/008 |
| WO | 2019/176325 A1 | | 9/2019 | |
| WO | 2019/198323 A1 | | 10/2019 | |
| WO | WO-2019193829 A1 | * | 10/2019 | G11B 20/1201 |
| WO | WO-2022064870 A1 | * | 3/2022 | |

OTHER PUBLICATIONS

JP 2009230504 A—English Translation—Published Oct. 8, 2009 (Year: 2009).*

WO 2019176325 A1—English Translation—Published Sep. 19, 2019 (Year: 2019).*

International Search Report issued in International Application No. PCT/JP2021/018100 dated Jun. 29, 2021.

Written Opinion of the ISA issued in International Application No. PCT/JP2021/018100 dated Jun. 29, 2021.

English language translation of the following: Explanation of Circumstances Concerning Accelerated Examination filed on Jul. 10, 2020 in a Japanese patent application No. 2020-090929 corresponding to the instant patent application.

English language translation of the following: Office action dated Aug. 5, 2020 from the JPO in a Japanese patent application No. 2020-090929 corresponding to the instant patent application.

English language translation of the following: Explanation of Circumstances Concerning Accelerated Examination filed on Nov. 18, 2020 in a Japanese patent application No. 2020-192022 corresponding to the instant patent application.

English language translation of the following: Office action dated Dec. 4, 2020 from the JPO in a Japanese patent application No. 2020-192022 corresponding to the instant patent application.

* cited by examiner

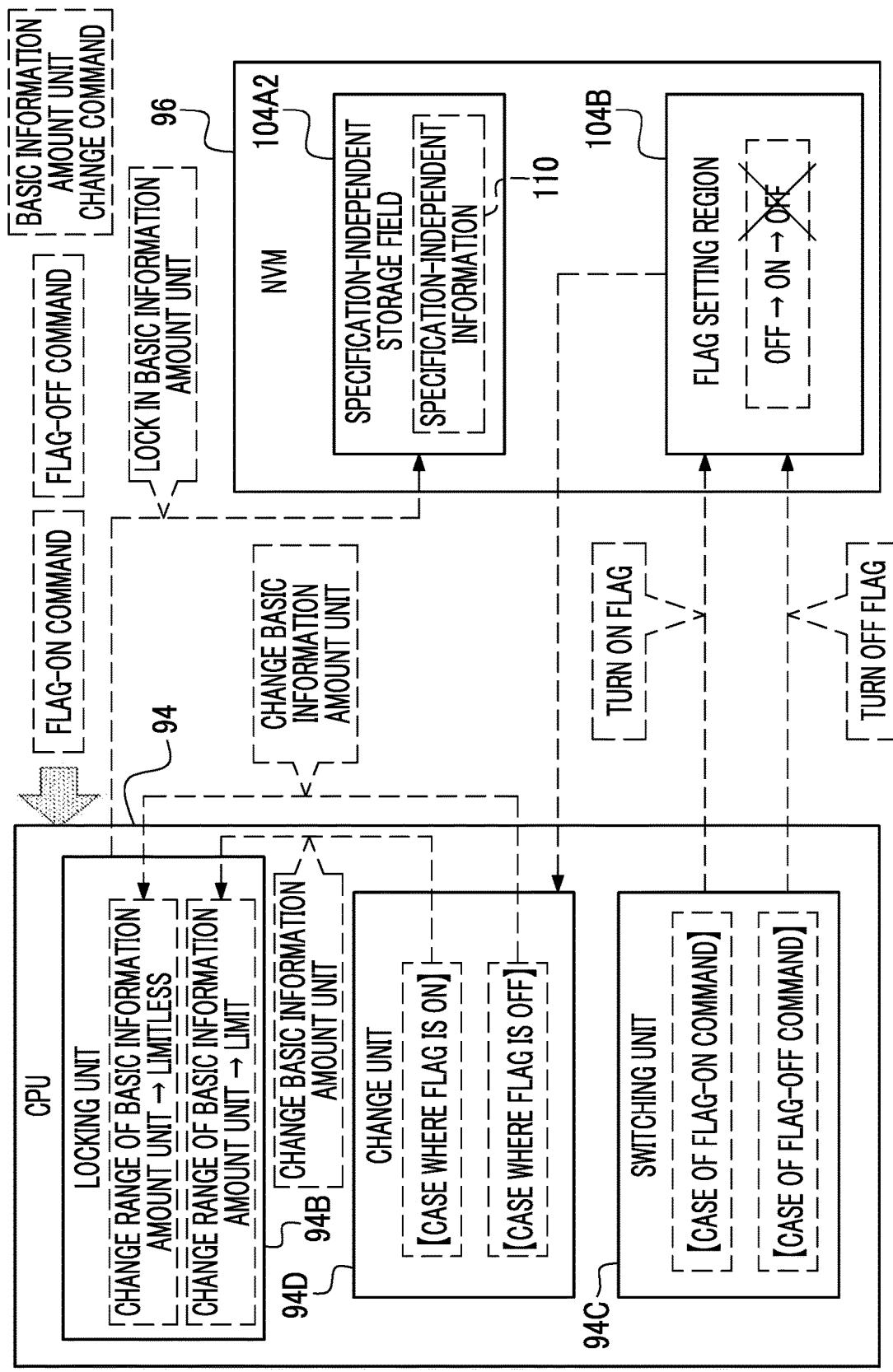

NONCONTACT COMMUNICATION MEDIUM, MAGNETIC TAPE CARTRIDGE, METHOD FOR OPERATING NONCONTACT COMMUNICATION MEDIUM, AND PROGRAM

CROSS-REFERENCE TO RELATED APPLICATIONS

This application is a continuation application of International Application No. PCT/JP2021/018100, filed May 12, 2021, the disclosure of which is incorporated herein by reference in its entirety. Further, this application claims priority from Japanese Patent Application No. 2020-090929, filed May 25, 2020, the disclosure of which is incorporated herein by reference in its entirety.

BACKGROUND

1. Technical Field

A technique of the present disclosure relates to a noncontact communication medium, a magnetic tape cartridge, a method for operating a noncontact communication medium, and a program.

2. Related Art

WO2019/198323A discloses a cartridge memory that is used in a tape cartridge, and comprises a communication unit, a non-volatile memory, and a controller. The communication unit performs communication with a recording and reproduction device using a wireless communication system specified by the ISO 14443-2 standard as a wireless communication standard. The non-volatile memory has a storage capacity greater than 16 KB. The controller performs write-in or readout of data with respect to the non-volatile memory in a WORD unit (2-BYTE unit) or a BLOCK unit (32-BYTE unit).

The non-volatile memory comprises a plurality of memory banks having a storage capacity equal to or less than 128 KB. The controller performs write-in or readout of data specified by a magnetic tape standard with respect to one or two or more first memory banks among the plurality of memory banks, and performs write-in or readout of additional data with respect to one or two or more second memory banks other than the first memory banks.

SUMMARY

By the way, the cartridge memory is a memory that is read and written by a drive as a main purpose. The cartridge memory has a storage block where information regarding an attribute of the cartridge memory is stored, and a storage block where information other than information regarding the attribute of the cartridge memory is stored. In general, the former storage block is used by a vendor of the cartridge memory, and the latter storage block is used by a vendor of the tape cartridge.

Information that is written in the cartridge memory by the vendor of the tape cartridge increases with an increase in storage capacity of a magnetic tape housed in the tape cartridge. In this case, in general, an increase in storage capacity of the cartridge memory is examined. Note that the increase in storage capacity of the cartridge memory accompanies a problem of an increase in size and an increase in cost of the cartridge memory.

An embodiment according to the technique of according to the technique of the present disclosure provides a noncontact communication medium, a magnetic tape cartridge, a method for operating a noncontact communication medium, and a program capable of storing many accompanying information in a memory compared to a case where accompanying information is not stored in a storage block where information regarding an attribute of a noncontact communication medium is stored.

A first aspect according to the technique of the present disclosure is a noncontact communication medium comprising a processor, and a memory incorporated in or connected to the processor, in which the noncontact communication medium performs noncontact communication with an external communication device, the memory has a storage block where information regarding an attribute of the noncontact communication medium is stored and that includes a plurality of storage fields, the plurality of storage fields include a specification-independent storage field where information independent of a specification of a magnetic tape cartridge, in which the noncontact communication medium is mounted, is stored, and the processor is configured to write accompanying information regarding the magnetic tape cartridge in the specification-independent storage field in response to an instruction given from the external communication device to the noncontact communication medium by the noncontact communication.

A second aspect according to the technique of the present disclosure is the noncontact communication medium according to the first aspect, in which the processor is configured to lock an area in the storage block where the write-in is performed, in a basic information amount unit.

A third aspect according to the technique of the present disclosure is the noncontact communication medium according to the second aspect, in which the basic information amount unit is a byte unit.

A fourth aspect according to the technique of the present disclosure is the noncontact communication medium according to the second aspect or the third aspect, in which the processor is configured to change the basic information amount unit to limitless in a case where a flag indicating limitation to change of the basic information amount unit is not set, and change the basic information amount unit with a current value of the basic information amount unit as a lower limit in a case where the flag is set.

A fifth aspect according to the technique of the present disclosure is the noncontact communication medium according to the fourth aspect, in which the flag is not switched from a set state to a non-set state after being switched from the non-set state to the set state.

A sixth aspect according to the technique of the present disclosure is the noncontact communication medium according to the first aspect, in which the processor is configured to lock an area in the storage block where the write-in of a value other than an initial value is performed.

A seventh aspect according to the technique of the present disclosure is the noncontact communication medium according to the sixth aspect, in which the processor is configured to performs write-in in order from a head address of the storage block, and the area is an area that is specified from an address in the storage block where the write-in of the value other than the initial value is performed.

An eighth aspect according to the technique of the present disclosure is the noncontact communication medium according to any one of the second aspect to the seventh aspect, in which the processor is configured to lock the area to generate a readout-dedicated area.

A ninth aspect according to the technique of the present disclosure is the noncontact communication medium according to any one of the first aspect to the eighth aspect, in which the plurality of storage fields include a specification-dependent storage field where information dependent on the specification is stored, and the specification-independent storage field, and the specification-dependent storage field is a readout-dedicated storage field.

A tenth aspect according to the technique of the present disclosure is the noncontact communication medium according to the ninth aspect, in which the specification-dependent storage field has an identifier storage field where an identifier capable of specifying the noncontact communication medium is stored, an error detection code storage field where an error detection code for information including the identifier is stored, a storage capacity-related information storage field where information regarding a storage capacity of the memory is stored, and a model-related information storage field where information regarding a model of the noncontact communication medium is stored.

An eleventh aspect according to the technique of the present disclosure is the noncontact communication medium according to any one of the first aspect to the tenth aspect, in which the specification-independent storage field has a type-dependent storage field where information dependent on a type of the noncontact communication medium is stored, and a type-independent storage field where information independent of the type is stored, and the processor is configured to write the accompanying information only in the type-independent storage field.

A twelfth aspect according to the technique of the present disclosure is the noncontact communication medium according to any one of the first aspect to the eleventh aspect, in which the accompanying information is different in content for each request given to the magnetic tape cartridge.

A thirteenth aspect according to the technique of the present disclosure is a magnetic tape cartridge comprising the noncontact communication medium according to any one of the first aspect to the twelfth aspect, and a magnetic tape, in which the memory stores management information regarding the magnetic tape.

A fourteenth aspect according to the technique of the present disclosure is a method for operating a noncontact communication medium that includes a memory incorporated in or connected to a processor and performs noncontact communication with an external communication device, in which the memory has a storage block where information regarding an attribute of the noncontact communication medium is stored and that includes a plurality of storage fields, and the plurality of storage fields include a specification-independent storage field where information independent of a specification of a magnetic tape cartridge, in which the noncontact communication medium is mounted, is stored, the method comprising writing accompanying information regarding the magnetic tape cartridge in the specification-independent storage field in response to an instruction given from the external communication device to the noncontact communication medium by the noncontact communication.

A fifteenth aspect according to the technique of the present disclosure is a program causing a computer, which is applied to a noncontact communication medium that includes a memory incorporated in or connected to a processor and performs noncontact communication with an external communication device, to execute a process, in which the memory has a storage block where information regarding an attribute of the noncontact communication medium is stored and that includes a plurality of storage fields, and the plurality of storage fields include a specification-independent storage field where information independent of a specification of a magnetic tape cartridge, in which the noncontact communication medium is mounted, is stored, the process comprising writing accompanying information regarding the magnetic tape cartridge in the specification-independent storage field in response to an instruction given from the external communication device to the noncontact communication medium by the noncontact communication.

BRIEF DESCRIPTION OF THE DRAWINGS

Exemplary embodiments of the technology of the disclosure will be described in detail based on the following figures, wherein:

FIG. 21 is a block diagram showing an example of processing contents in a case where a flag-on command, a flag-off command, and a basic information amount unit change command are selectively given to the CPU;

DETAILED DESCRIPTION

Figure 1:
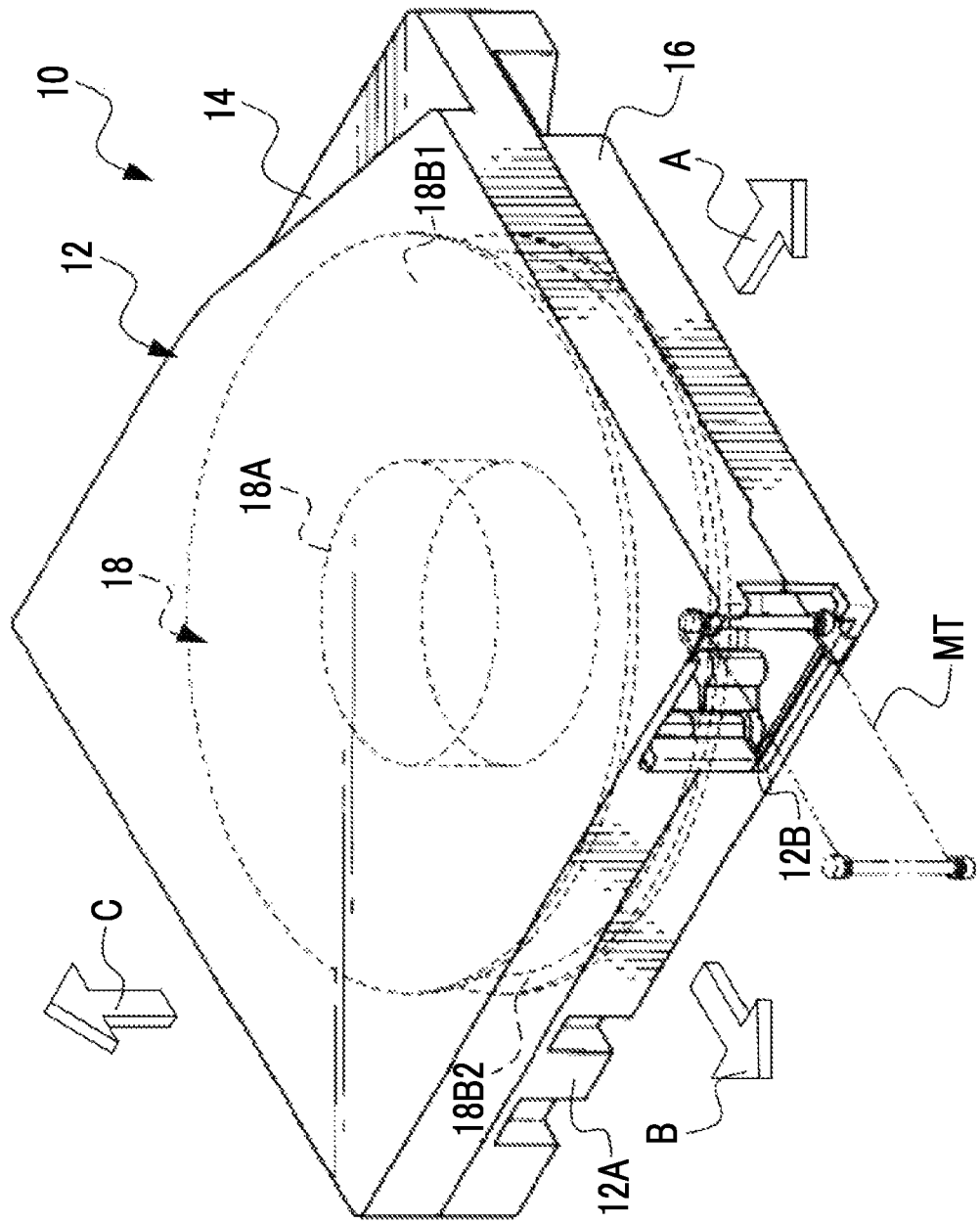
FIG. 1 is a schematic perspective view showing an example of the appearance of a magnetic tape cartridge.

Hereinafter, an example of an embodiment of a noncontact communication medium, a magnetic tape cartridge, a method for operating a noncontact communication medium, and a program according to the technique of the present disclosure will be described referring to the accompanying drawings.

First, terms that are used in the following description will be described.

CPU is an abbreviation for "Central Processing Unit". RAM is an abbreviation for "Random Access Memory". NVM is an abbreviation for "Non-Volatile Memory". ROM is an abbreviation for "Read Only Memory". EEPROM is an abbreviation for "Electrically Erasable and Programmable Read Only Memory". SSD is an abbreviation for "Solid State Drive". USB is an abbreviation for "Universal Serial Bus". ASIC is an abbreviation for "Application Specific Integrated Circuit". PLD is an abbreviation for "Programmable Logic Device". FPGA is an abbreviation for "Field-Programmable Gate Array". SoC is an abbreviation for "System-on-a-Chip". IC is an abbreviation for "Integrated Circuit". RFID is an abbreviation for "Radio Frequency IDentifier". LTO is an abbreviation for "Linear Tape-Open". CM is an abbreviation for "Cartridge Memory". IBM is an abbreviation for "International Business Machines Corporation".

In the following description, for convenience of description, in FIG. 1, a loading direction of a magnetic tape cartridge 10 on a magnetic tape drive 30 (see FIG. 4) is indicated by an arrow A, a direction of the arrow A is referred to a front direction of the magnetic tape cartridge 10, and a side in the front direction of the magnetic tape cartridge 10 is referred to as a front side of the magnetic tape cartridge 10. In the following description of the structure, "front" indicates the front side of the magnetic tape cartridge 10.

In the following description, for convenience of description, in FIG. 1, a direction of an arrow B perpendicular to the direction of the arrow A is referred to as a right direction, and a side in the right direction of the magnetic tape cartridge 10 is referred to as a right side of the magnetic tape cartridge 10. In the following description of the structure, "right" indicates the right side of the magnetic tape cartridge 10.

In the following description, for convenience of description, in FIG. 1, a direction perpendicular to the direction of the arrow A and the direction of the arrow B is indicated by an arrow C, a direction of the arrow C is referred to as an upper direction of the magnetic tape cartridge 10, and a side in the upper direction of the magnetic tape cartridge 10 is referred to as an upper side of the magnetic tape cartridge 10. In the following description of the structure, "upper" indicates the upper side of the magnetic tape cartridge 10.

In the following description, for convenience of description, in FIG. 1, a direction opposite to the front direction of the magnetic tape cartridge 10 is referred to as a rear direction of the magnetic tape cartridge 10, and a side in the rear direction of the magnetic tape cartridge 10 is referred to as a rear side of the magnetic tape cartridge 10. In the following description of the structure, "rear" indicates the rear side of the magnetic tape cartridge 10.

In the following description, for convenience of description, in FIG. 1, a direction opposite to the upper direction of the magnetic tape cartridge 10 is referred to as a lower direction of the magnetic tape cartridge 10, and a side in the lower direction of the magnetic tape cartridge 10 is referred to as a lower side of the magnetic tape cartridge 10. In the following description of the structure, "lower" indicates the lower side of the magnetic tape cartridge 10.

In the following description, although LTO will be described as an example as the standard of the magnetic tape cartridge 10, this is merely an example, and other standards, such as IBM3592, may be employed.

First Embodiment

As shown in FIG. 1 as an example, the magnetic tape cartridge 10 has a substantially rectangular shape in plan view, and comprises a box-shaped case 12. The case 12 is formed of resin, such as polycarbonate, and comprises an upper case 14 and a lower case 16. The upper case 14 and the lower case 16 are bonded by welding (for example, ultrasonic welding) and screwing in a state in which a lower peripheral edge surface of the upper case 14 and an upper peripheral edge surface of the lower case 16 are brought into contact with each other. A bonding method is not limited to welding and screwing, and other bonding methods may be used.

Inside the case 12, a cartridge reel 18 is rotatably housed. The cartridge reel 18 comprises a reel hub 18A, an upper flange 18B1, and a lower flange 18B2. The reel hub 18A is formed in a cylindrical shape. The reel hub 18A is a shaft center portion of the cartridge reel 18, has a shaft center direction along an up-down direction of the case 12, and is disposed in a center portion of the case 12. Each of the upper flange 18B1 and the lower flange 18B2 is formed in an annular shape. A center portion in plan view of the upper flange 18B 1 is fixed to an upper end portion of the reel hub 18A, and a center portion in plan view of the lower flange 18B2 is fixed to a lower end portion of the reel hub 18A. A magnetic tape MT is wound around an outer peripheral surface of the reel hub 18A, and an end portion in a width direction of the magnetic tape MT is held by the upper flange 18B 1 and the lower flange 18B2.

An opening 12B is formed on a front side of a right wall 12A of the case 12. The magnetic tape MT is pulled out from the opening 12B.

Figure 2:
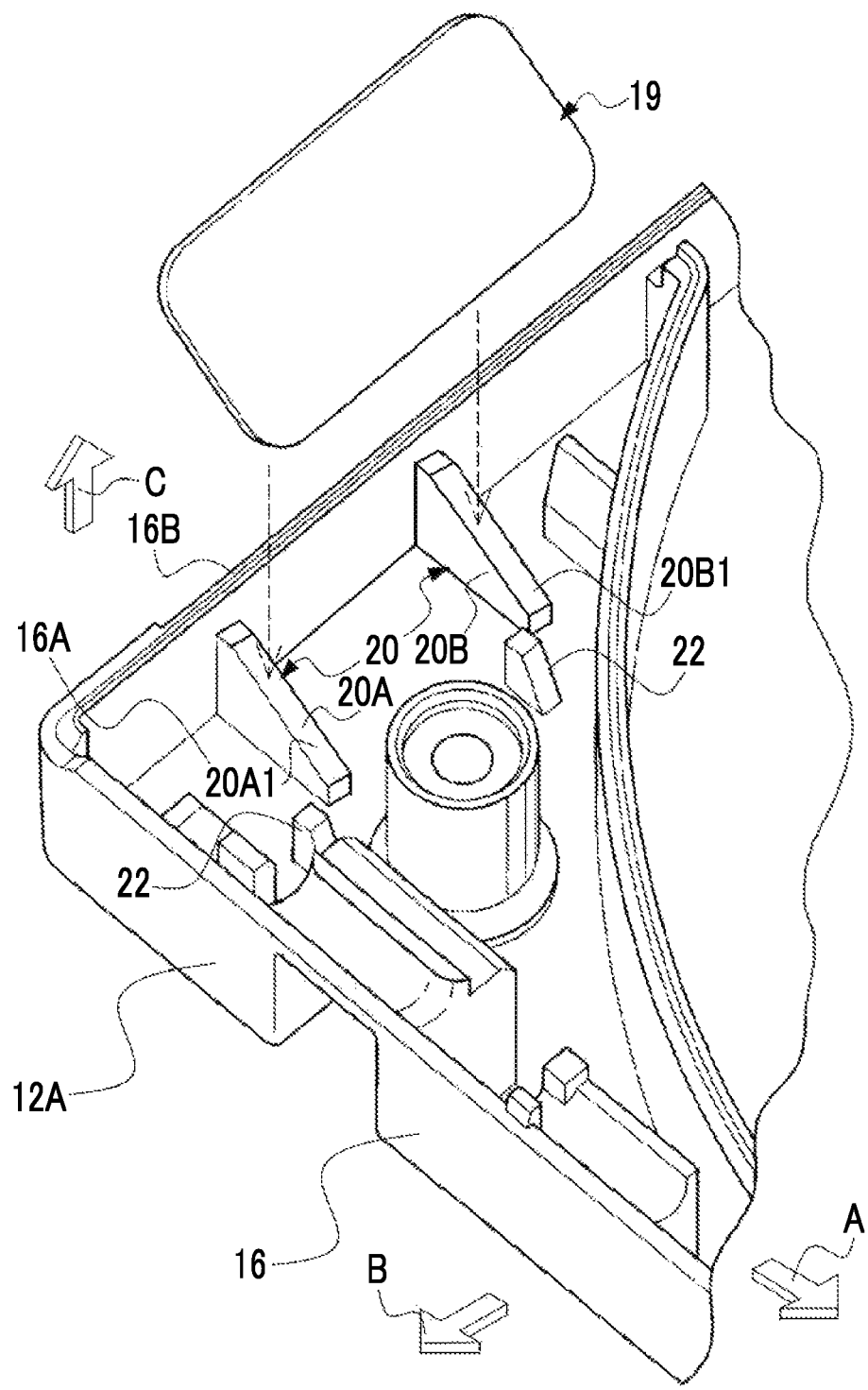
FIG. 2 is a schematic perspective view showing an example of the structure of a rear right end portion inside a lower case of the magnetic tape cartridge.

As shown in FIG. 2 as an example, a cartridge memory 19 is housed in a rear right end portion of the lower case 16. The cartridge memory 19 is an example of a "noncontact communication medium" according to the technique of the present disclosure. In the present embodiment, a so-called passive type RFID tag is employed as the cartridge memory 19.

Information (not shown) regarding the magnetic tape MT is stored in the cartridge memory 19. Information regarding the magnetic tape MT indicates, for example, management information (not shown) for managing the magnetic tape cartridge 10. The management information includes, for example, information regarding the cartridge memory 19, information capable of specifying the magnetic tape cartridge 10, and information indicating a recording capacity of the magnetic tape MT, the outline of information (hereinafter, referred to as "recorded information") recorded on the magnetic tape MT, items of the recorded information, and a recording format of the recorded information.

The cartridge memory 19 performs noncontact communication with an external communication device (not shown). Examples of the external communication device include a reading and writing device that is used in a production process of the magnetic tape cartridge 10 and a reading and writing device (for example, a noncontact reading and writing device 50 shown in FIGS. 4 to 6) that is used in a magnetic tape drive (for example, the magnetic tape drive 30 shown in FIG. 4).

The external communication device performs reading and writing of various kinds of information with respect to the cartridge memory 19 in a noncontact manner. Though details will be described below, the cartridge memory 19 generates power with electromagnetic application to a magnetic field MF (see FIG. 5) from the external communication device. Then, the cartridge memory 19 operates using the generated power and performs transfer of various kinds of information with the external communication device by performing communication with the external communication device through the magnetic field.

As shown in FIG. 2 as an example, a support member 20 is provided on an inner surface of a bottom plate 16A in the rear right end portion of the lower case 16. The support member 20 is a pair of inclined mounts that supports the cartridge memory 19 from below in an inclined state. A pair of inclined mounts is a first inclined mount 20A and a second inclined mount 20B. The first inclined mount 20A and the second inclined mount 20B are disposed at an interval in a right-left direction of the case 12 and are integrated with an inner surface of a rear wall 16B of the lower case 16 and the inner surface of the bottom plate 16A. The first inclined mount 20A has an inclined surface 20A1, and the inclined surface 20A1 is inclined downward from the inner surface of the rear wall 16B toward the inner surface of the bottom plate 16A. The second inclined mount 20B has an inclined surface 20B1, and the inclined surface 20B1 is also inclined downward from the inner surface of the rear wall 16B toward the inner surface of the bottom plate 16A.

In front of the support member 20, a pair of position restriction ribs 22 is disposed at an interval in the right-left direction. A pair of position restriction ribs 22 is provided upright on the inner surface of the bottom plate 16A and restricts a position of a lower end portion of the cartridge memory 19 in a state of being disposed on the support member 20.

Figure 3:
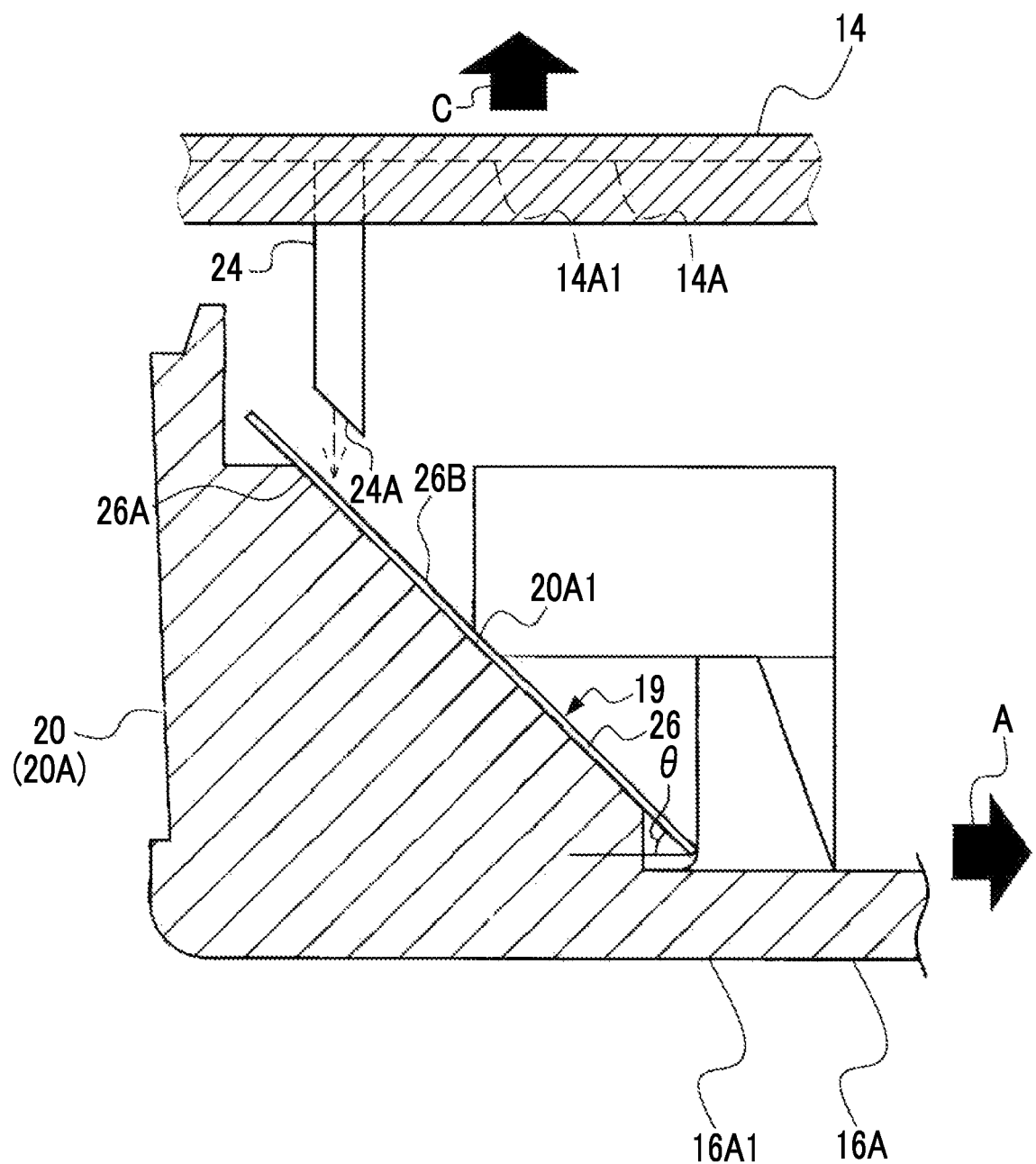
FIG. 3 is a side cross-sectional view showing an example of a support member provided on an inner surface of the lower case of the magnetic tape cartridge.

As shown in FIG. 3 as an example, a reference surface 16A1 is formed on an outer surface of the bottom plate 16A. The reference surface 16A1 is a plane. Here, the plane indicates a surface parallel to a horizontal plane in a case where the lower case 16 is placed on the horizontal plane such that the bottom plate 16A turns toward a lower side. Here, "parallel" indicates parallel in a meaning including an error that is generally allowed in the technical field to which the technique of the present disclosure belongs, and an error to such an extent not contrary to the spirit and scope of the technique of that the present disclosure, in addition to completely parallel. An inclination angle $\theta$ of the support member 20, that is, an inclination angle of each of the inclined surface 20A1 and the inclined surface 20B1 (see FIG. 2) is 45 degrees with respect to the reference surface 16A1. The inclination angle of 45 degrees is merely an example, and may be in a range of "0 degrees<inclination angle $\theta$<45 degrees".

The cartridge memory 19 comprises a substrate 26. The substrate 26 is placed on the support member 20 such that a back surface 26A of the substrate 26 turns toward a lower side, and the support member 20 supports the back surface 26A of the substrate 26 from below. A part of the back surface 26A of the substrate 26 is in contact with the inclined surface of the support member 20, that is, the inclined surfaces 20A1 and 20B 1 (see FIG. 2), and a front surface 26B of the substrate 26 is exposed to an inner surface 14A1 side of a top plate 14A of the upper case 14.

The upper case 14 comprises a plurality of ribs 24. A plurality of ribs 24 are disposed at intervals in the right-left direction of the case 12. A plurality of ribs 24 are provided to protrude downward from the inner surface 14A1 of the top plate 14A of the upper case 14, and a distal end surface 24A of each rib 24 has an inclined surface corresponding to the inclined surfaces 20A1 and 20B1 (see FIG. 2). That is, the distal end surface 24A of each rib 24 is inclined at 45 degrees with respect to the reference surface 16A1.

In a case where the upper case 14 is bonded to the lower case 16 as described above in a state in which the cartridge memory 19 is disposed on the support member 20, the distal end surface 24A of each rib 24 comes into contact with the substrate 26 from the front surface 26B side, and the substrate 26 is pinched by the distal end surface 24A of each rib 24 and the inclined surfaces 20A1 and 20B1 (see FIG. 2) of the support member 20. With this, a position in an up-down direction of the cartridge memory 19 is restricted by the ribs 24.

Figure 4:
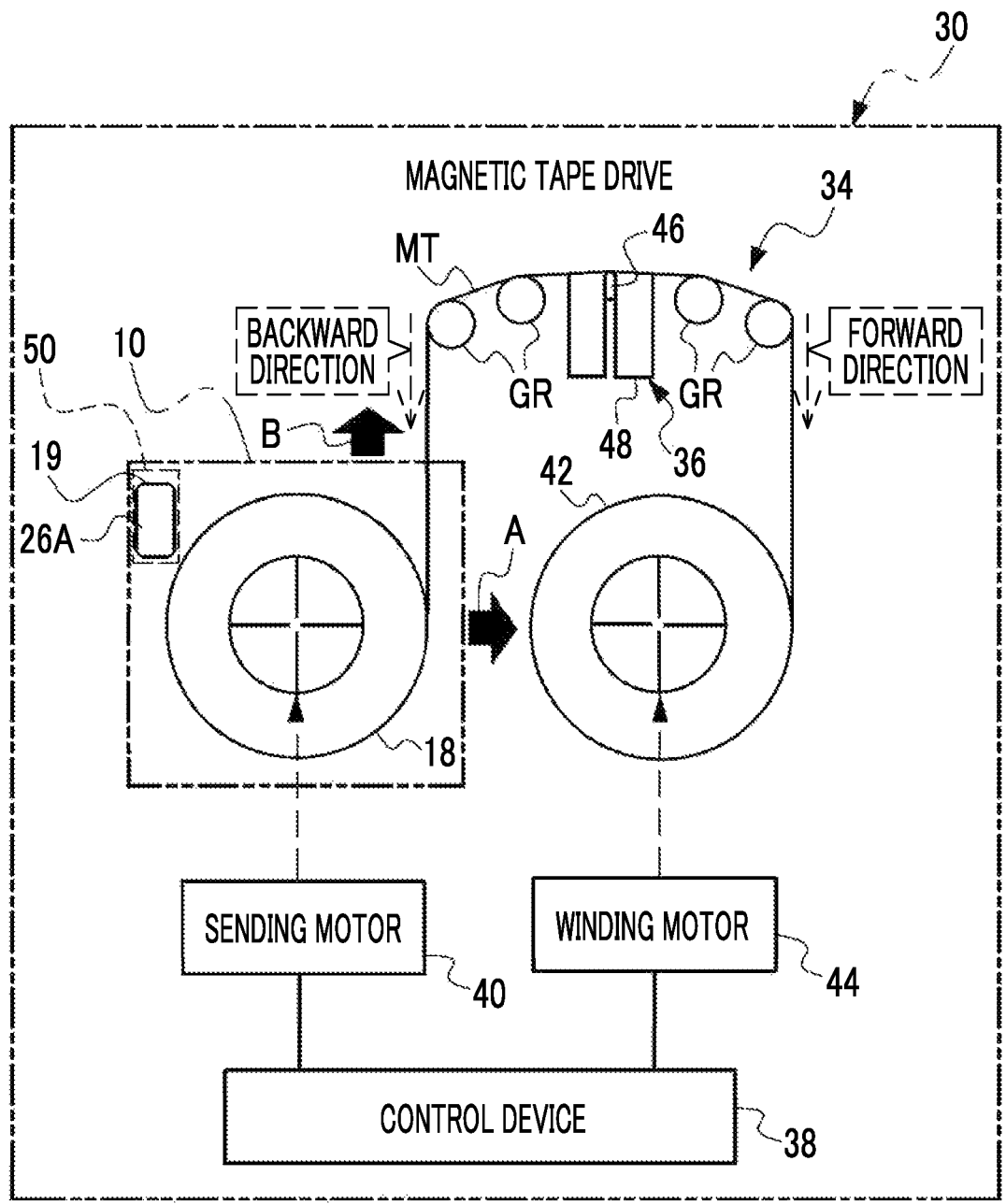
FIG. 4 is a schematic configuration diagram showing an example of the hardware configuration of a magnetic tape drive.

As shown in FIG. 4 as an example, the magnetic tape drive 30 comprises a transport device 34, a reading head 36, and a control device 38. The magnetic tape cartridge 10 is loaded into the magnetic tape drive 30. The magnetic tape drive 30 is a device that pulls out the magnetic tape MT from the magnetic tape cartridge 10 and reads recorded information from the pulled-out magnetic tape MT using the reading head 36 by a linear scanning method. In the present embodiment, in other words, reading of the recorded information indicates reproduction of the recorded information. Here, although reading of the recorded information by the reading head 36 has been illustrated, the technique of the present disclosure is not limited thereto, and data may be written in the magnetic tape MT by a write-in head, data may be written in the magnetic tape MT or data may be read from the magnetic tape MT by a magnetic head.

The control device 38 controls the operation of the entire magnetic tape drive 30. In the present embodiment, although the control device 38 is realized by an ASIC, the technique of the present disclosure is not limited thereto. For example, the control device 38 may be realized by an FPGA. Alternatively, the control device 38 may be realized by a computer including a CPU, a ROM, and a RAM. In addition, the control device 38 may be realized by combining two or more of an ASIC, an FPGA, and a computer. That is, the control device 38 may be realized by a combination of a hardware configuration and a software configuration.

The transport device 34 is a device that selectively transports the magnetic tape MT in a forward direction and a backward direction, and comprises a sending motor 40, a winding reel 42, a winding motor 44, a plurality of guide rollers GR, and the control device 38.

The sending motor 40 rotates the cartridge reel 18 in the magnetic tape cartridge 10 under the control of the control device 38. The control device 38 controls the sending motor 40 to control a rotation direction, a rotation speed, rotation torque, and the like of the cartridge reel 18.

In a case where the magnetic tape MT is wound around the winding reel 42, the control device 38 rotates the sending motor 40 such that the magnetic tape MT runs in the backward direction. A rotation speed, rotation torque, and the like of the sending motor 40 are adjusted according to a speed of the magnetic tape MT wound around the winding reel 42.

The winding motor 44 rotates the winding reel 42 under the control of the control device 38. The control device 38 controls the winding motor 44 to control a rotation direction, a rotation speed, rotation torque, and the like of the winding reel 42.

In a case where the magnetic tape MT is wound around the winding reel 42, the control device 38 rotates the winding motor 44 such that the magnetic tape MT runs in the forward direction. A rotation speed, rotation torque, and the like of the winding motor 44 are adjusted according to the speed of the magnetic tape MT wound around the winding reel 42.

The rotation speed, the rotation torque, and the like of each of the sending motor 40 and the winding motor 44 are adjusted in this manner, whereby tension in a predetermined range is applied to the magnetic tape MT. Here, the predetermined range indicates, for example, a range of tension obtained from a computer simulation and/or a test with a real machine as a range of tension in which data can be read from the magnetic tape MT by the reading head 36.

In a case of rewinding the magnetic tape MT to the cartridge reel 18, the control device 38 rotates the sending motor 40 and the winding motor 44 such that the magnetic tape MT runs in the backward direction.

In the present embodiment, although the rotation speed, the rotation torque, and the like of each of the sending motor 40 and the winding motor 44 are controlled such that the tension of the magnetic tape MT is controlled, the technique of the present disclosure is not limited thereto. For example, the tension of the magnetic tape MT may be controlled using a dancer roller or may be controlled by drawing the magnetic tape MT to a vacuum chamber.

Each of a plurality of guide rollers GR is a roller that guides the magnetic tape MT. A running path of the magnetic tape MT is determined by separately disposing a plurality of guide rollers GR at positions straddling over the reading head 36 between the magnetic tape cartridge 10 and the winding reel 42.

The reading head 36 comprises a reading element 46 and a holder 48. The reading element 46 is held by the holder 48 to come into contact with the magnetic tape MT during running, and reads recorded information from the magnetic tape MT transported by the transport device 34.

The magnetic tape drive 30 comprises the noncontact reading and writing device 50. The noncontact reading and writing device 50 is disposed to confront the back surface 26A of the cartridge memory 19 below the magnetic tape drive 30 in a state in which the magnetic tape cartridge 10 is loaded. The state in which the magnetic tape cartridge 10 is loaded into the magnetic tape drive 30 indicates, for example, a state in which the magnetic tape cartridge 10 reaches a position determined in advance as a position where the magnetic tape cartridge 10 starts to read the recorded information with respect to the magnetic tape MT by the reading head 36.

In the example shown in FIG. 4, although an aspect example where the noncontact reading and writing device 50 is mounted on the magnetic tape drive 30 has been shown, the technique of the present disclosure is not limited thereto. The noncontact reading and writing device 50 is also used in a stage where the magnetic tape cartridge 10 is manufactured, a stage where the magnetic tape cartridge 10 is inspected, or a stage where the magnetic tape cartridge 10 is shipped. In this case, for example, a stationary or portable noncontact reading and writing device 50 is used. The noncontact reading and writing device 50 is an example of an "external communication device" according to the technique of the present disclosure.

Figure 5:
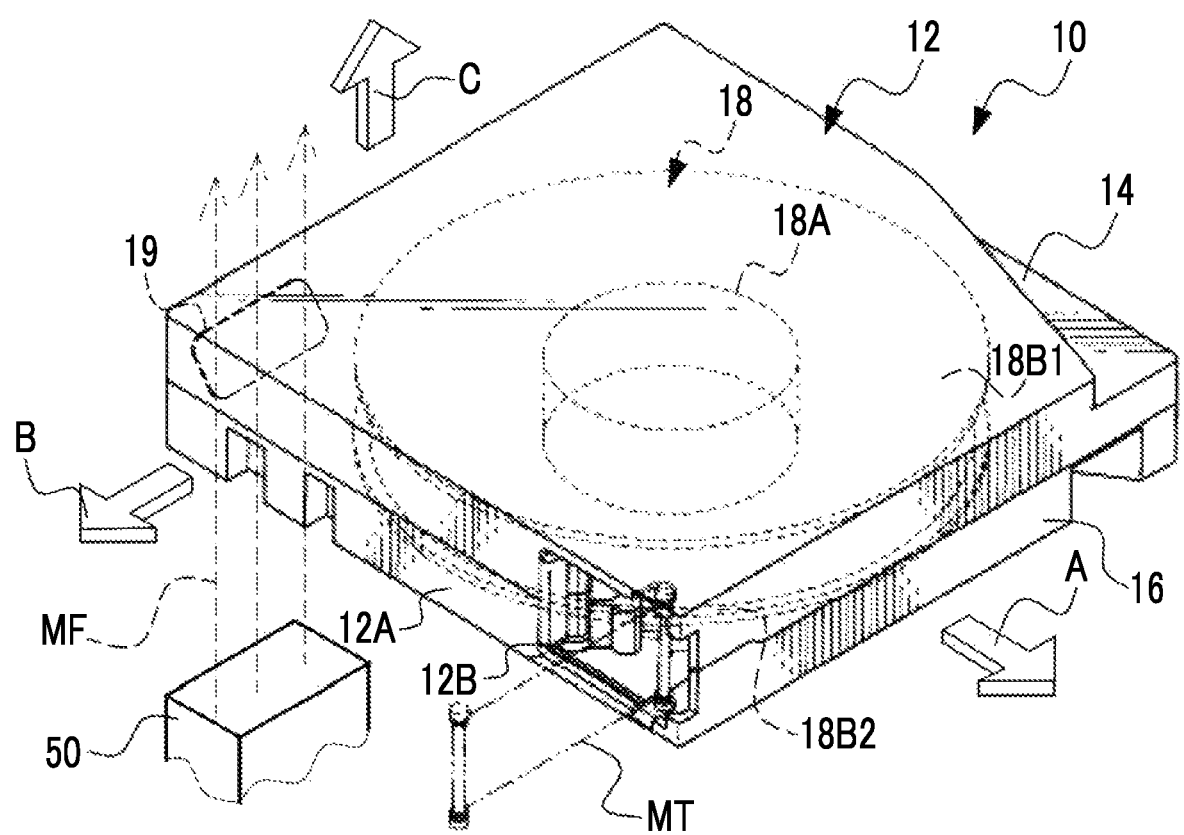
FIG. 5 is a schematic perspective view showing an example of an aspect in which a magnetic field is discharged from a lower side of the magnetic tape cartridge by a noncontact reading and writing device.

As shown in FIG. 5 as an example, the noncontact reading and writing device 50 emits a magnetic field MF from below the magnetic tape cartridge 10 toward the cartridge memory 19. The magnetic field MF passes through the cartridge memory 19.

Figure 6:
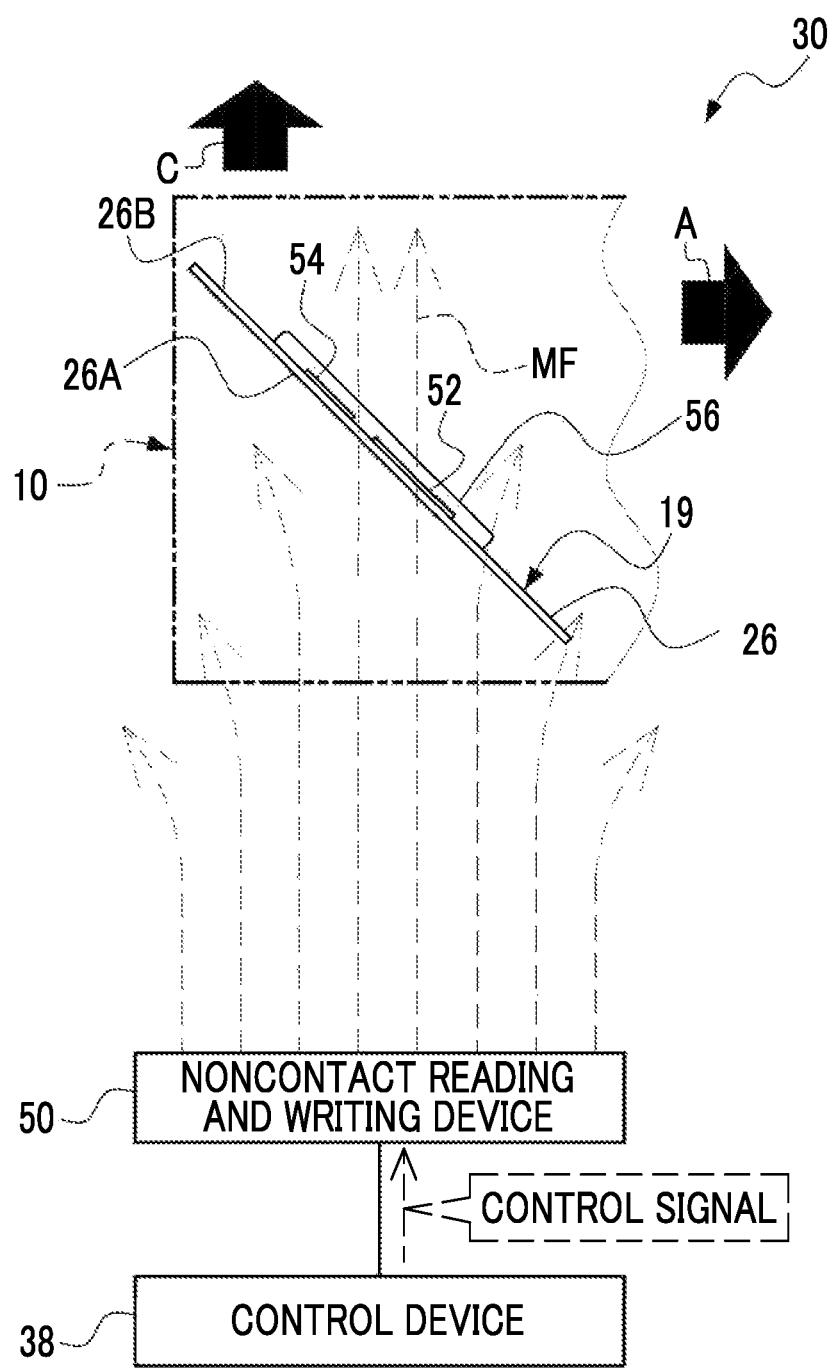
FIG. 6 is a conceptual diagram showing an example of an aspect in which a magnetic field is applied from the noncontact reading and writing device to a cartridge memory in the magnetic tape cartridge.

As shown in FIG. 6 as an example, the noncontact reading and writing device 50 is connected to the control device 38. The control device 38 outputs a control signal for controlling the cartridge memory 19 to the noncontact reading and writing device 50. The noncontact reading and writing device 50 emits the magnetic field MF toward the cartridge memory 19 in response to the control signal input from the control device 38. The magnetic field MF passes through the cartridge memory 19 from the back surface 26A side to the front surface 26B side.

The noncontact reading and writing device 50 performs noncontact communication with the cartridge memory 19 to give a command signal depending on the control signal to the cartridge memory 19. In more detail, the noncontact reading and writing device 50 spatially transmits a command signal to the cartridge memory 19 under the control of the control device 38. Though described below in detail, the command signal is a signal indicating a command to the cartridge memory 19.

Here, although a form example where the noncontact reading and writing device 50 spatially transmits the command signal to the cartridge memory 19 under the control of the control device 38 has been described as an example, the technique of the present disclosure is not limited thereto. For example, in a stage where the magnetic tape cartridge 10 is manufactured, a stage where the magnetic tape cartridge 10 is inspected, or a stage where the magnetic tape cartridge 10 is shipped, the noncontact reading and writing device 50 spatially transmits the command signal to the cartridge memory 19 under the control of a control device different from the control device 38.

In a case where the command signal is spatially transmitted from the noncontact reading and writing device 50 to the cartridge memory 19, the command signal depending on an instruction from the control device 38 is included in the magnetic field MF by the noncontact reading and writing device 50. In other words, the command signal is superimposed on the magnetic field MF by the noncontact reading and writing device 50. That is, the noncontact reading and writing device 50 transmits the command signal to the cartridge memory 19 through the magnetic field MF under the control of the control device 38.

An IC chip 52 and a capacitor 54 are mounted on the front surface 26B of the cartridge memory 19. The IC chip 52 and the capacitor 54 are bonded to the front surface 26B. The IC chip 52 and the capacitor 54 are sealed with a sealing material 56 on the front surface 26B of the cartridge memory 19. Here, as the sealing material 56, ultraviolet curable resin that is cured upon reaction with ultraviolet rays is employed. The ultraviolet curable resin is merely an example, and photocurable resin that is cured upon reaction with light in a wavelength range other than ultraviolet rays may be used as the sealing material 56, thermosetting re sin may be used as the sealing material 56, or other adhesives may be used as the sealing material 56.

Figure 7:
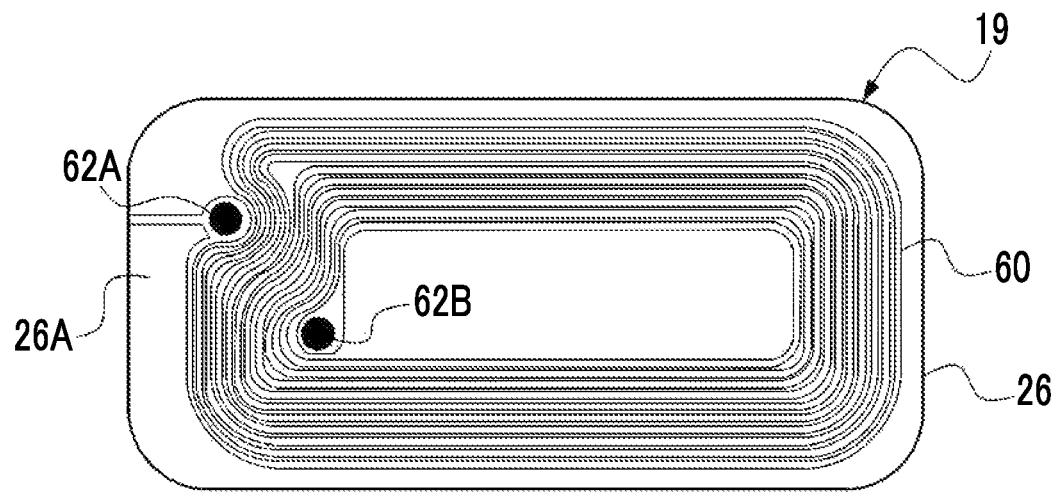
FIG. 7 is a schematic bottom view showing an example of the structure of a back surface of a substrate of the cartridge memory in the magnetic tape cartridge.

As an example, as shown in FIG. 7, a coil 60 is formed in a loop shape on the back surface 26A of the cartridge memory 19. Here, as a material of the coil 60, copper foil is employed. The copper foil is merely an example, and for example, other kinds of conductive materials, such as aluminum foil, may be used. The coil 60 induces an induced current with application of the magnetic field MF (see FIGS. 5 and 6) from the noncontact reading and writing device 50.

A first conduction portion 62A and a second conduction portion 62B are provided on the back surface 26A of the cartridge memory 19. The first conduction portion 62A and the second conduction portion 62B have solders and electrically connect both end portions of the coil 60 to the IC chip 52 (see FIGS. 6 and 8) and the capacitor 54 (see FIGS. 6 and 8) on the front surface 26B.

Figure 8:
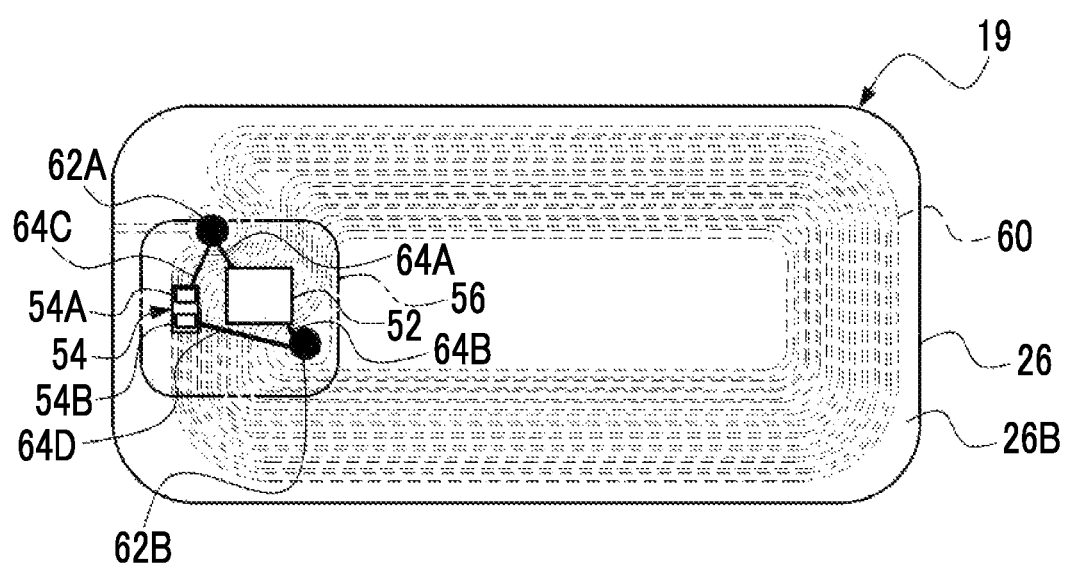
FIG. 8 is a schematic plan view showing an example of the structure of a front surface of the substrate of the cartridge memory in the magnetic tape cartridge.

As an example, as shown in FIG. 8, on the front surface 26B of the cartridge memory 19, the IC chip 52 and the capacitor 54 are electrically connected to each other using a wired connection method. Specifically, one terminal of a positive electrode terminal and a negative electrode terminal of the IC chip 52 is connected to the first conduction portion 62A through a wiring 64A, and the other terminal is connected to the second conduction portion 62B through a wiring 64B. The capacitor 54 has a pair of electrodes. In the example shown in FIG. 8, a pair of electrodes is electrodes 54A and 54B. The electrode 54A is connected to the first conduction portion 62A through a wiring 64C, and the electrode 54B is connected to the second conduction portion 62B through a wiring 64D. With this, the IC chip 52 and the capacitor 54 are connected in parallel with the coil 60.

Figure 9:
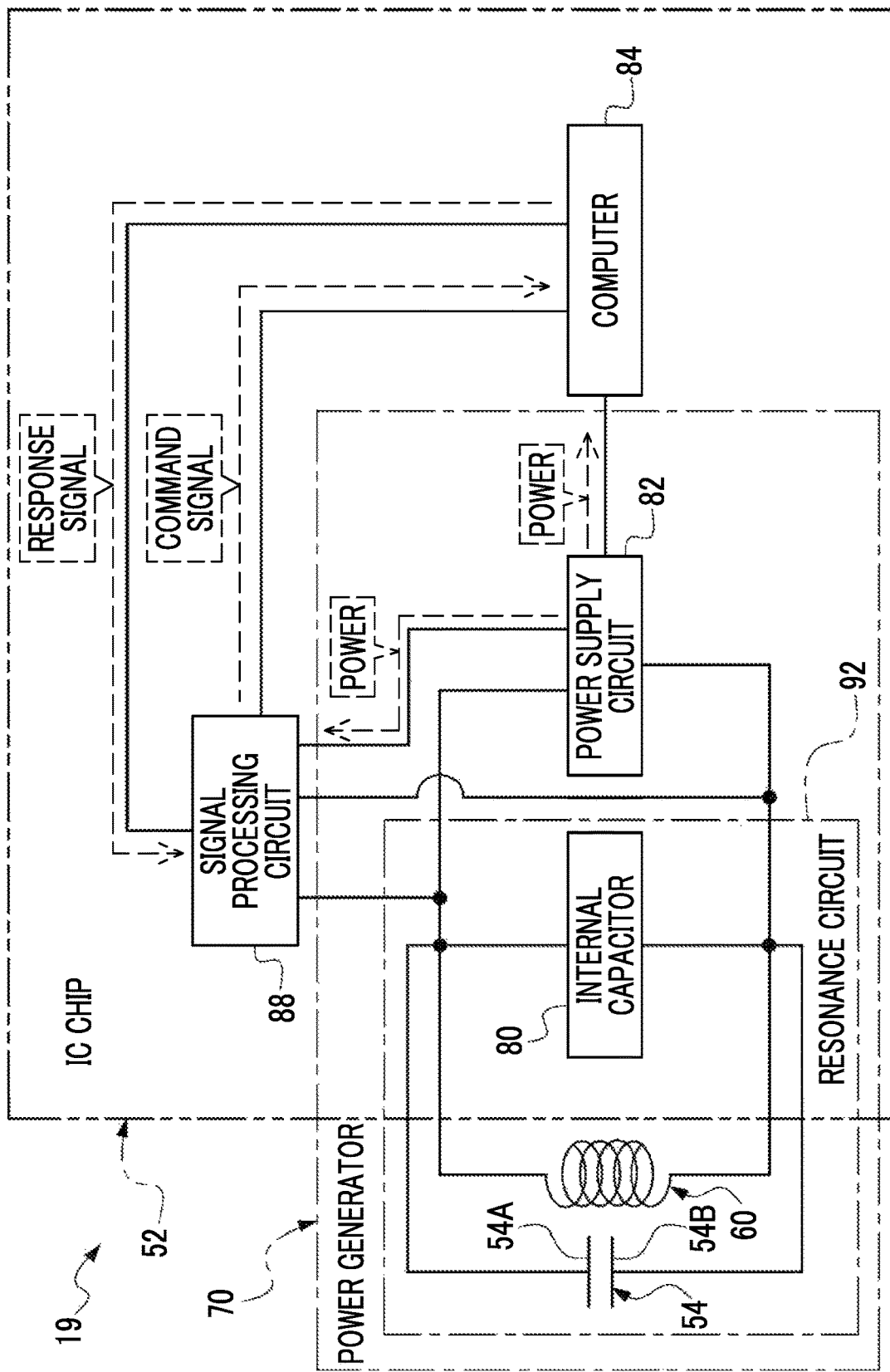
FIG. 9 is a schematic circuit diagram showing an example of the circuit configuration of the cartridge memory in the magnetic tape cartridge.

As shown in FIG. 9 as an example, the IC chip 52 comprises an internal capacitor 80, a power supply circuit 82, a computer 84, a clock signal generator (not shown), and a signal processing circuit 88. The IC chip 52 is a general-purpose IC chip that is also usable for purposes other than the magnetic tape cartridge 10.

The cartridge memory 19 comprises a power generator 70. The power generator 70 generates power with application of the magnetic field MF from the noncontact reading and writing device 50 to the coil 60. Specifically, the power generator 70 generates alternating-current power using a resonance circuit 92, converts the generated alternating-current power into direct-current power, and outputs the direct-current power.

The power generator 70 has the resonance circuit 92 and the power supply circuit 82. The resonance circuit 92 comprises the capacitor 54, the coil 60, and the internal capacitor 80. The internal capacitor 80 is a capacitor incorporated in the IC chip 52, and the power supply circuit 82 is also a circuit incorporated in the IC chip 52. The internal capacitor 80 is connected in parallel with the coil 60.

The capacitor 54 is a capacitor externally attached to the IC chip 52. The IC chip 52 is a general-use IC chip that is intrinsically usable for purposes different from the magnetic tape cartridge 10. For this reason, the capacitance of the internal capacitor 80 is not enough to realize a resonance frequency required for the cartridge memory 19 used in the magnetic tape cartridge 10. Accordingly, in the cartridge memory 19, the capacitor 54 is post-attached to the IC chip 52 as a capacitor having a capacitance value necessary in making the resonance circuit 92 resonate at a resonance frequency determined in advance with the application of the magnetic field MF. The resonance frequency determined in advance is the same frequency as the frequency of the magnetic field MF, and here, 13.56 MHz is employed. The capacitance of the capacitor 54 is determined based on a measured value of the capacitance of the internal capacitor 80.

The resonance circuit 92 generates an alternating-current power by generating a resonance phenomenon at the resonance frequency determined in advance using the induced current induced by the coil 60 with the magnetic field MF passing through the coil 60 and outputs the generated alternating-current power to the power supply circuit 82.

The power supply circuit 82 has a rectifier circuit, a smoothing circuit, and the like. The rectifier circuit is a full-wave rectifier circuit having a plurality of diodes. The full-wave rectifier circuit is merely an example, and a half-wave rectifier circuit may be used. The smoothing circuit includes a capacitor and a resistor. The power supply circuit 82 converts the alternating-current power input from the resonance circuit 92 into direct-current power and supplies the converted direct-current power (hereinafter, simply referred to as "power") to various drive elements in the IC chip 52. Examples of various drive elements include the computer 84, the clock signal generator (not shown), and the signal processing circuit 88. In this way, power is supplied to various drive elements in the IC chip 52 by the power generator 70, whereby the IC chip 52 operates using power generated by the power generator 70.

The computer 84 is an example of a "computer that is applied to a noncontact communication medium" according to the technique of the present disclosure, and controls the entire cartridge memory 19.

The clock signal generator (not shown) generates a clock signal and outputs the clock signal to various drive elements. Various drive elements operate in response to the clock signal input from the clock signal generator knot shown). The clock signal generator not shown) changes a frequency of the clock signal in response to an instruction of the computer 84.

The signal processing circuit 88 is connected to the resonance circuit 92. The signal processing circuit 88 has a decoding circuit (not shown) and an encoding circuit (not shown). The decoding circuit of the signal processing circuit 88 extracts and decodes a command signal from the magnetic field MF received by the coil 60 and outputs the command signal to the computer 84. The computer 84 outputs a response signal to the command signal to the signal processing circuit 88. That is, the computer 84 executes processing according to the command signal input from the signal processing circuit 88 and outputs a processing result as a response signal to the signal processing circuit 88. In the signal processing circuit 88, in a case where the response signal is input from the computer 84, the encoding circuit of the signal processing circuit 88 encodes the response signal to modulate the response signal and outputs the response signal to the resonance circuit 92. The resonance circuit 92 transmits the response signal input from the encoding circuit of the signal processing circuit 88 to the noncontact reading and writing device 50 through the magnetic field MF.

Figure 10:
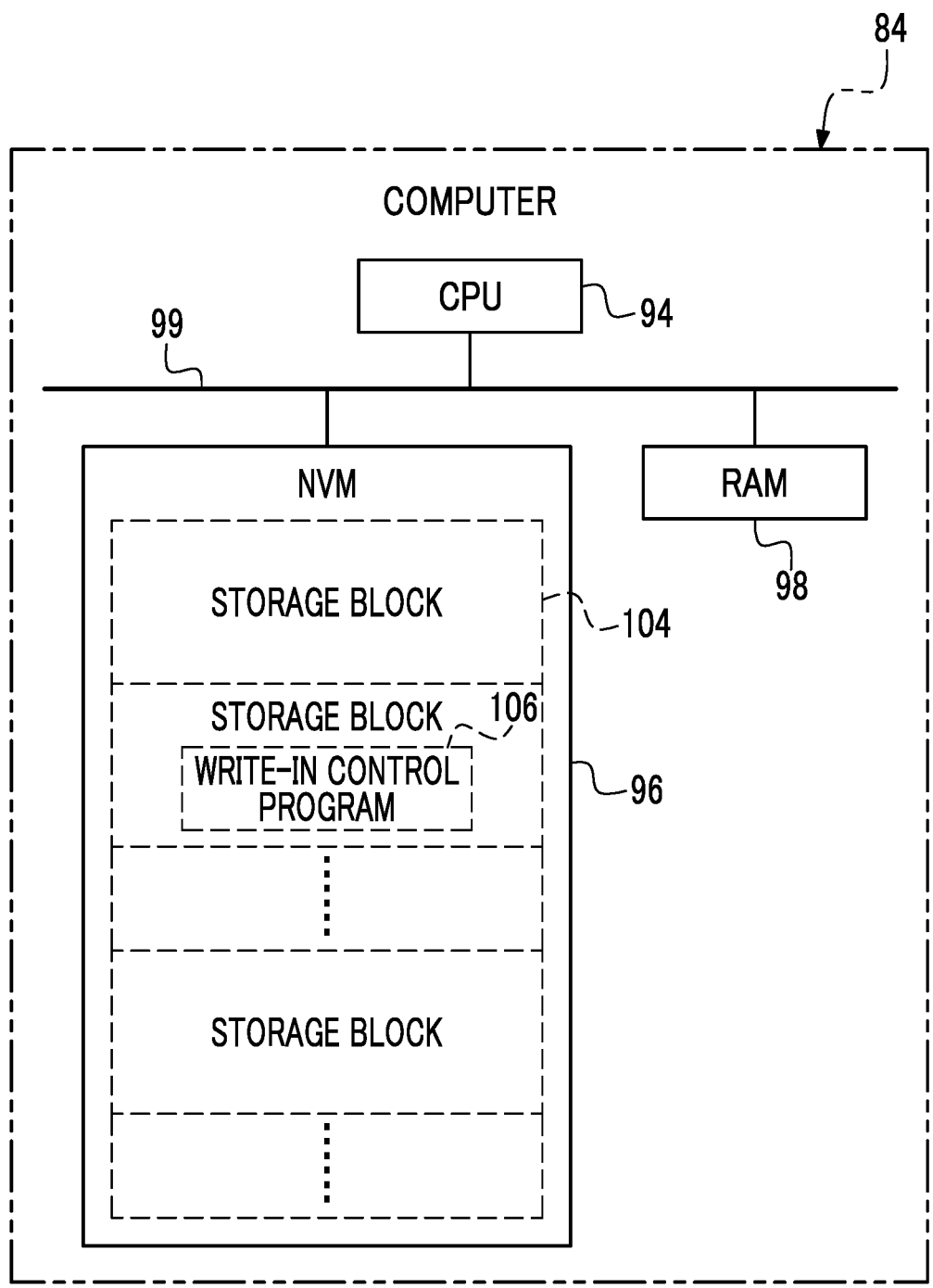
FIG. 10 is a block diagram showing an example of the hardware configuration of a computer of an IC chip mounted on the cartridge memory in the magnetic tape cartridge.

As an example, as shown in FIG. 10, the computer 84 comprises a CPU 94, an NVM 96, and a RAM 98. The CPU 94, the NVM 96, and the RAM 98 are connected to a bus 99.

The CPU 94 is an example of a "processor" according to the technique of the present disclosure. The CPU 94 controls the entire cartridge memory 19. The NVM 96 is an example of a "memory" according to the technique of the present disclosure. An example of the NVM 96 is an EEPROM. The EEPROM is merely an example, and for example, a ferroelectric memory may be used instead of the EEPROM or any memory may be used as long as the memory is a non-volatile memory that can be mounted on the IC chip 52. The NVM 96 has a plurality of storage blocks 104. Management information (not shown) and the like are stored in the plurality of storage blocks 104.

The CPU 94 selectively executes polling processing, readout processing, write-in processing, locking processing, and the like depending on the command signal input from the signal processing circuit 88. The polling processing is processing of establishing communication with the noncontact reading and writing device 50, and is executed, for example, as preparation processing in a pre-stage of the readout processing and the write-in processing. The readout processing is processing of reading out the management information and the like from the NVM 96. The write-in processing is processing of writing the management information and the like in the NVM 96. The locking processing is processing of locking a CM attribute information storage block 104A (see FIG. 11) that is one of the plurality of storage blocks 104, in other words, processing of disabling rewriting of information stored in the CM attribute information storage block 104A. Here, a meaning of "rewriting of information" also includes a meaning of "erasure of information".

In the present embodiment, while specification-dependent information 108 (see FIG. 12) described below is stored in one storage block 104 (here, the CM attribute information storage block 104A shown in FIG. 11 as an example) among the plurality of storage blocks 104 of the NVM 96 in the cartridge memory 19 that is provided to a vendor of the magnetic tape cartridge 10, that is, the cartridge memory 19 that is charged in a manufacturing process of the magnetic tape cartridge 10, specification-independent information 110 (see FIG. 12) described below is not stored. For this reason, the vendor of the magnetic tape cartridge 10 causes the CPU 94 to execute write-in processing in the manufacturing process of the magnetic tape cartridge 10, whereby the specification-independent information 110 (see FIG. 12) described below is written in one storage block 104 (here, the CM attribute information storage block 104A shown in FIG. 11 as an example) among the plurality of storage blocks 104.

A write-in control program 106 is stored in one of the plurality of storage blocks 104. The CPU 94 reads out the write-in control program 106 from one of the plurality of storage blocks 104 and executes the write-in control program 106 on the RAM 98. Write-in control processing (see FIG. 19) described below is realized with execution of the write-in control program 106 by the CPU 94.

Figure 11:
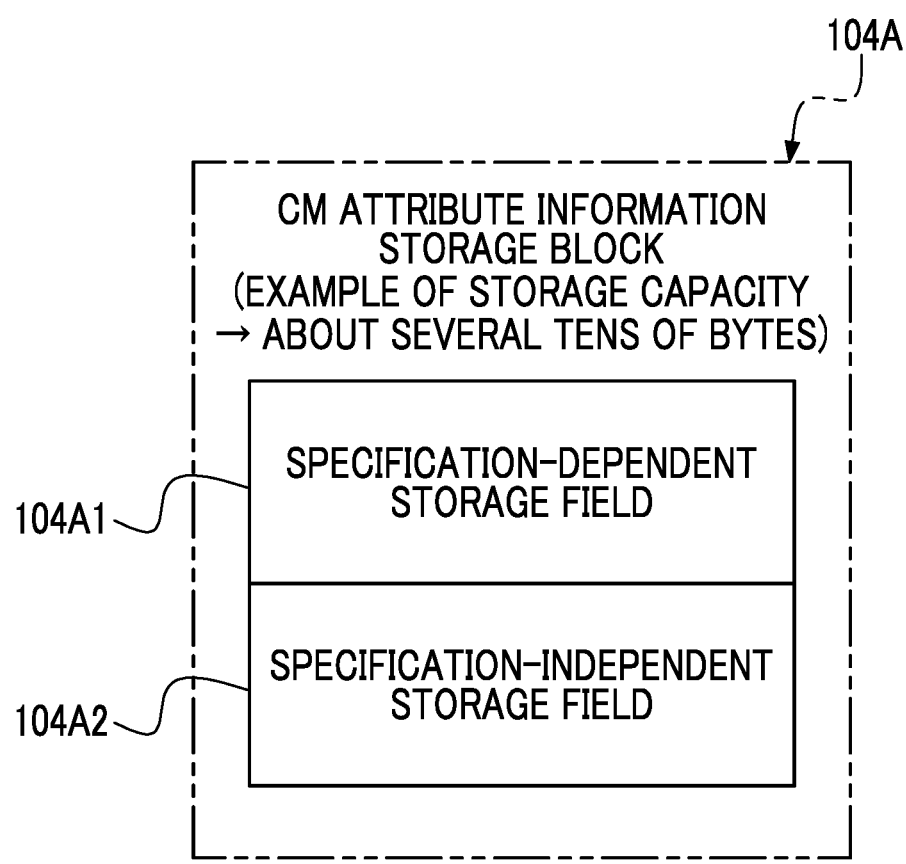
FIG. 11 is a block diagram showing an example of the schematic configuration of a CM attribute information storage block.

One (for example, the storage block 104 including a head address among the plurality of storage blocks 104) of the plurality of storage blocks 104 is the CM attribute information storage block 104A as shown in FIG. 11 as an example. The CM attribute information storage block 104A is an example of a "storage block" according to the technique of the present disclosure. That is, the CM attribute information storage block 104A is a storage block that stores information (hereinafter, referred to as "CM attribute information") indicating an attribute of the cartridge memory 19. A storage capacity of the CM attribute information storage block 104A is, for example, several tens of bytes (as an example, 32 bytes).

The CM attribute information storage block 104A includes a plurality of storage fields. The plurality of storage fields are classified roughly into a specification-dependent storage field 104A1 and a specification-independent storage field 104A2.

Figure 12:
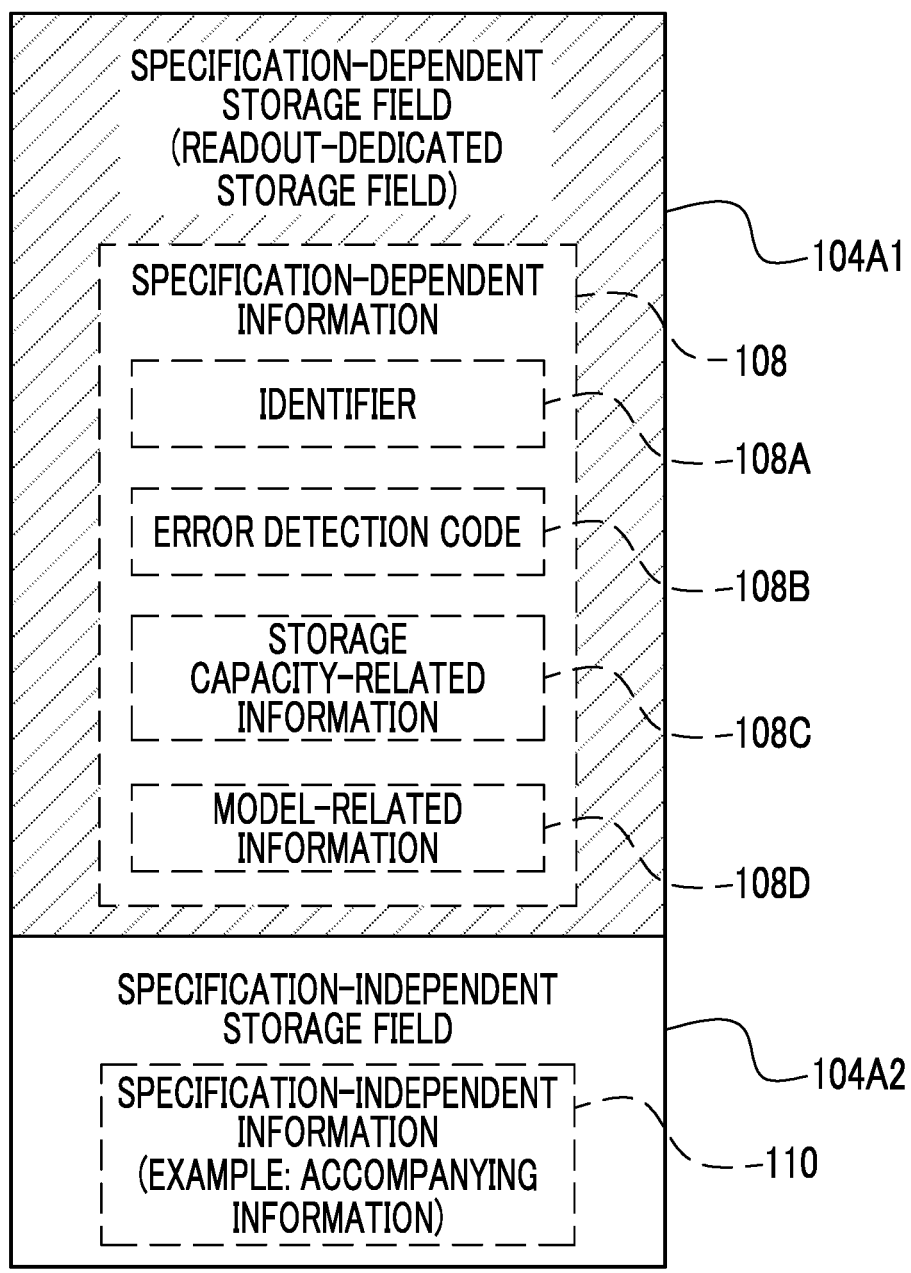
FIG. 12 is a block diagram showing an example of information that is stored in the CM attribute information storage block.

As shown in FIG. 12 as an example, the specification-dependent information 108 is stored in the specification-dependent storage field 104A1. The specification-dependent storage field 104A1 is, for example, a storage field that is used by a vendor of the cartridge memory 19, and is made to be a readout-dedicated storage field in a stage where the vendor of the magnetic tape cartridge 10 obtains the cartridge memory 19 (for example, a stage where the magnetic tape cartridge 10 is manufactured). That is, the specification-dependent storage field 104A1 is a readout-dedicated storage field (see a hatched region shown in FIG. 12 as an example) and is locked in an unrewritable state.

The specification-dependent information 108 indicates information dependent on a specification of the magnetic tape cartridge 10, in which the cartridge memory 19 is mounted, in other words, information that is determined depending on the specification of the magnetic tape cartridge 10, in which the cartridge memory 19 is mounted.

The specification-independent information 110 is stored in the specification-independent storage field 104A2. The specification-independent information 110 indicates information independent of the specification of the magnetic tape cartridge 10, in which the cartridge memory 19 is mounted, in other words, information other than information that is determined depending on the specification of the magnetic tape cartridge 10, in which the cartridge memory 19 is mounted.

In the present embodiment, as an example of the specification-independent information 110, accompanying information is applied. The accompanying information is information regarding the magnetic tape cartridge 10. The accompanying information is additional information that is given to the cartridge memory 19 primarily by the vendor of the magnetic tape cartridge 10. In other words, the accompanying information is also referred to as information that is added by follow-up with respect to fundamental information (for example, the specification-dependent information 108)

given to the cartridge memory 19 by the vendor of the cartridge memory 19. An example of information regarding the magnetic tape cartridge 10 is information regarding the recorded information. The content of the accompanying information is different for each request given to the magnetic tape cartridge 10 by the vendor of the magnetic tape cartridge 10.

Here, the request given to the magnetic tape cartridge 10 by the vendor of the magnetic tape cartridge 10 indicates, for example, a request based on an order from a delivery destination (for example, customer) of the magnetic tape cartridge 10 received by the vendor of the magnetic tape cartridge 10. In a case where the order received by the vendor of the magnetic tape cartridge 10 is different for delivery destination (for example, customer) of the magnetic tape cartridge 10, the request given to the magnetic tape cartridge 10 by the vendor of the magnetic tape cartridge 10 is also different, and accordingly, the content of the accompanying information is also different.

Here, although an example where the content of the accompanying information is different for each request given to the magnetic tape cartridge 10 has been described, the technique of the present disclosure is not limited thereto, and the content of the accompanying information may be fixed.

The specification-independent information 110 is given from the noncontact reading and writing device 50 to the cartridge memory 19 by noncontact communication between the noncontact reading and writing device 50 and the cartridge memory 19. The specification-independent information 110 given from the noncontact reading and writing device 50 to the cartridge memory 19 is written in the specification-independent storage field 104A2 by the CPU 94.

Figure 13:
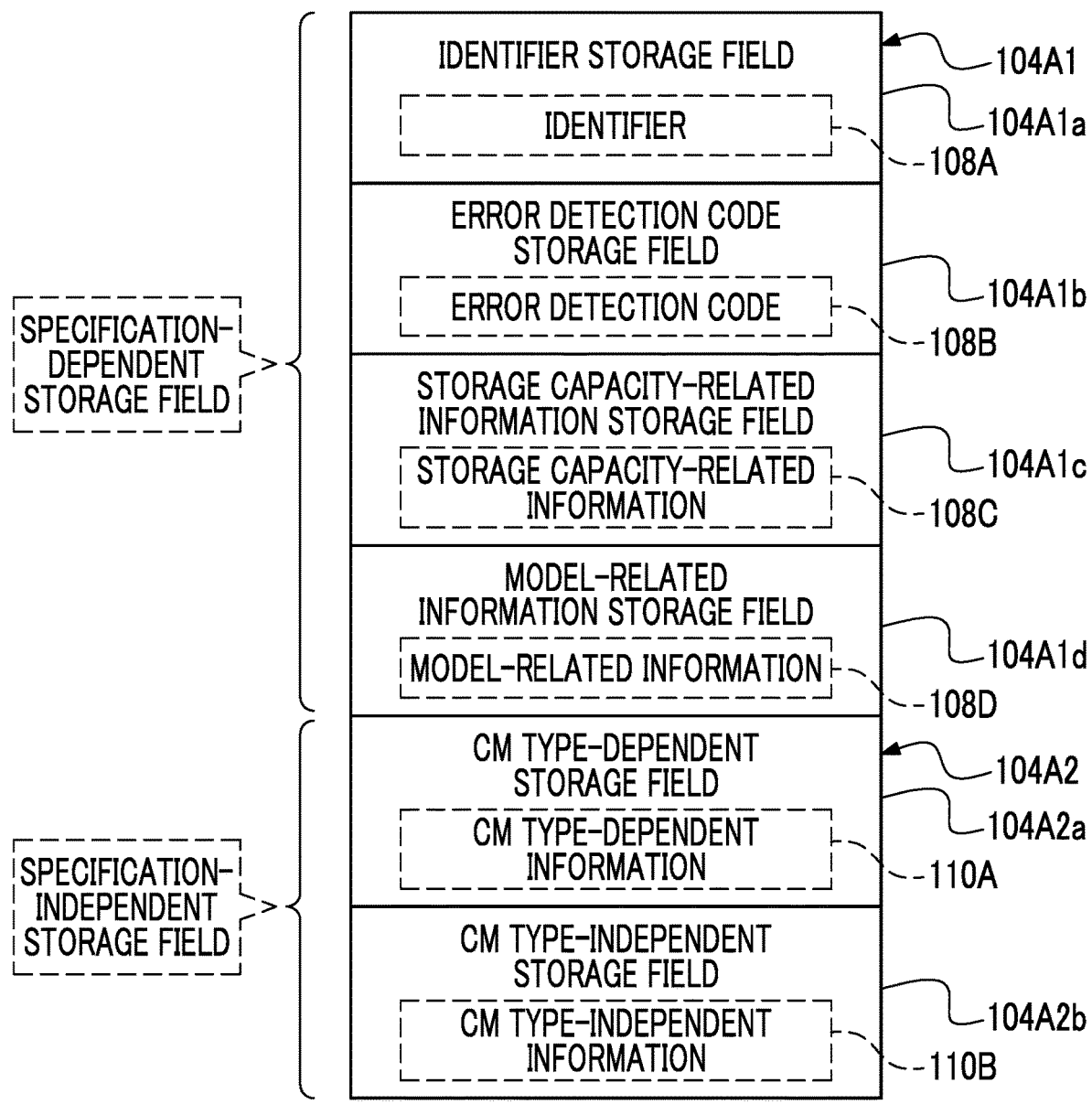
FIG. 13 is a block diagram showing an example of the schematic configuration of a specification-dependent storage field and a specification-independent storage field in the CM attribute information storage block.

As shown in FIG. 13 as an example, the specification-dependent storage field 104A1 has an identifier storage field 104A1a, an error detection code storage field 104A1b, a storage capacity-related information storage field 104A1c, and a model-related information storage field 104A1d. The specification-independent storage field 104A2 is classified roughly into a CM type-dependent storage field 104A2a and a CM type-independent storage field 104A2b. The CM type-dependent storage field 104A2a is an example of a "type-dependent storage field" according to the technique of the present disclosure, and the CM type-independent storage field 104A2b is an example of a "type-independent storage field" according to the technique of the present disclosure.

A storage capacity of each of the identifier storage field 104A1a, the error detection code storage field 104A1b, the storage capacity-related information storage field 104A1c, the model-related information storage field 104A1d, and the CM type-dependent storage field 104A2a is, for example, about several bytes, and a storage capacity of the CM type-independent storage field 104A2b is, for example, about several tens of bytes.

In more detail, for example, the storage capacity of the identifier storage field 104A1a is four bytes, the storage capacity of each of the error detection code storage field 104A1b and the storage capacity-related information storage field 104A1c is one byte, the storage capacity of each of the model-related information storage field 104A1d and the CM type-dependent storage field 104A2a is two bytes, and the storage capacity of the CM type-independent storage field 104A2b is 22 bytes.

An identifier 108A (for example, a serial number) capable of specifying the cartridge memory 19 is stored in the identifier storage field 104A1a. A code 108B (hereinafter, referred to as an "error detection code 108B") for error detection for the identifier 108A is stored in the error detection code storage field 104A1b. An example of the error detection code 108B is a check sum.

Here, although the error detection code 108B for the identifier 108A has been illustrated, the technique of the present disclosure is not limited thereto, and the error detection code 108B may be a code for error detection for a plurality of kinds of information including at least the identifier 108A in the specification-dependent information 108. Here, although the check sum is used as an example of the error detection code 108B, the technique of the present disclosure is not limited thereto, and other codes for error detection, such as a parity bit or a humming code, may be employed.

Storage capacity-related information 108C is stored in the storage capacity-related information storage field 104A1c. The storage capacity-related information 108C is information related to the storage capacity of the NVM 96 (for example, the storage capacity of the plurality of storage blocks 104). Model-related information 108D is stored in the model-related information storage field 104A1d. The model-related information 108D is information related to a model of the cartridge memory 19.

The specification-independent storage field 104A2 has the CM type-dependent storage field 104A2a and the CM type-independent storage field 104A2b. The specification-independent information 110 (see FIG. 12) is classified roughly into CM type-dependent information 110A and CM type-independent information 110B. The CM type-dependent information 110A is stored in the CM type-dependent storage field 104A2a. The CM type-independent information 110B is stored in the CM type-independent storage field 104A2b. The CM type-dependent information 110A indicates information dependent on a type of the cartridge memory 19. That is, the CM type-dependent information 110A is information determined depending on the type of the cartridge memory 19. The CM type-independent information 110B indicates information that is information independent of the type of the cartridge memory 19. That is, the CM type-independent information 110B is information determined independently of the type of the cartridge memory 19.

The CM type-dependent information 110A is given from the noncontact reading and writing device 50 to the cartridge memory 19 by noncontact communication between the noncontact reading and writing device 50 (for example, the noncontact reading and writing device 50 that is used in a stage where the magnetic tape cartridge 10 is manufactured) and the cartridge memory 19. The CM type-dependent information 110A given from the noncontact reading and writing device 50 to the cartridge memory 19 is stored in the CM type-dependent storage field 104A2a by the CPU 94.

The CM type-independent information 110B is given from the noncontact reading and writing device 50 to the cartridge memory 19 by noncontact communication between the noncontact reading and writing device 50 (for example, the noncontact reading and writing device 50 that is used in a stage where the magnetic tape cartridge 10 is manufactured) and the cartridge memory 19. The CM type-independent information 110B given from the noncontact reading and writing device 50 to the cartridge memory 19 is stored in the CM type-independent storage field 104A2b by the CPU 94.

Figure 14:
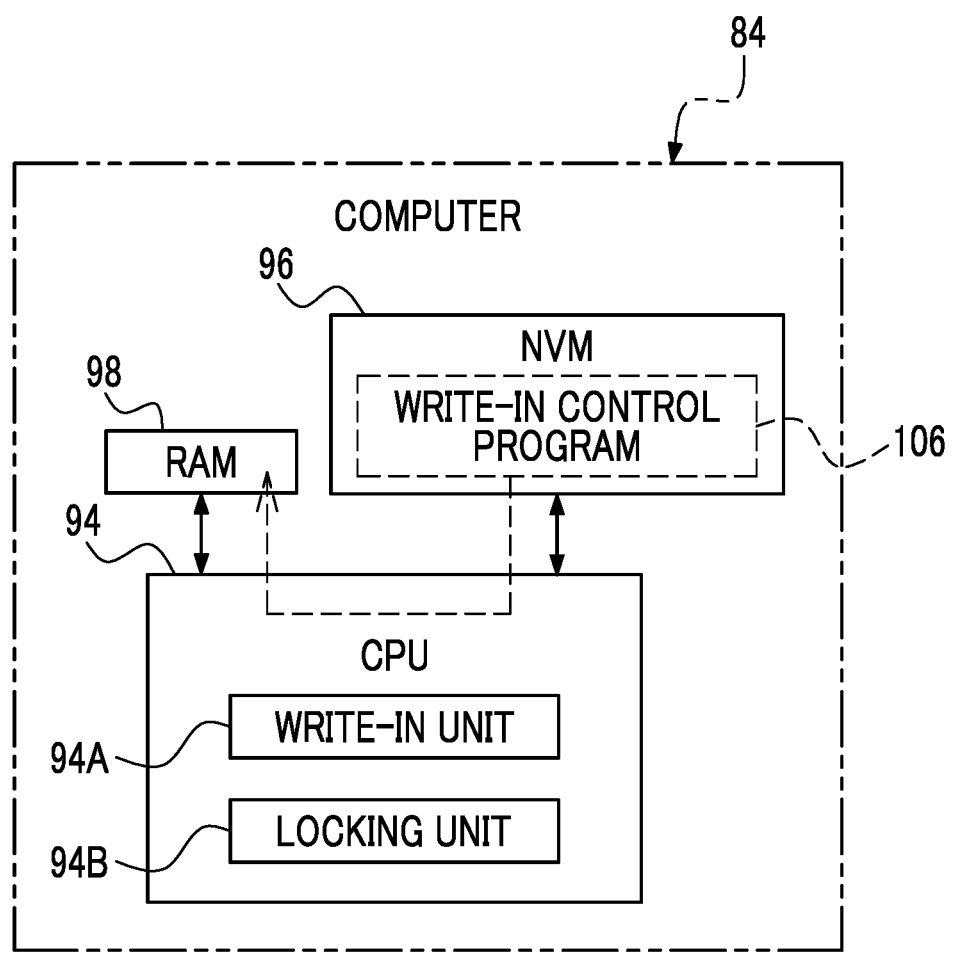
FIG. 14 is a block diagram showing an example of a main function of a CPU that is realized with execution of a write-in control program according to a first embodiment by a CPU of the cartridge memory.

As shown in FIG. 14 as an example, the CPU 94 reads out the write-in control program 106 from the NVM 96 and executes the read-out write-in control program 106 on the RAM 98. The CPU 94 operates as a write-in unit 94A and a locking unit 94B following the write-in control program 106 that is executed on the RAM 98, thereby executing write-in control processing (see FIG. 17) described below.

By the way, the CPU 94 operates in response to the command signal input from the signal processing circuit 88. A command indicated by the command signal is a polling command, a readout command, a write-in command, or the like. In a case where the command indicated by the command signal is the polling command, the CPU 94 executes the polling processing. In a case where the command indicated by the command signal is the readout command, the CPU 94 executes the readout processing. In a case where the command indicated by the command signal is the write-in command, the CPU 94 executes the write-in processing.

There are a plurality of types of write-in commands. The write-in unit 94A executes write-in processing depending on a type of a write-in command indicated by the command signal input from the signal processing circuit 88. Examples of the type of the write-in command include a write-in command for a CM attribute information storage block and a write-in command for a normal storage block. The write-in command for a CM attribute information storage block is a command to instruct write-in of information to the CM attribute information storage block 104A. The write-in command for a normal storage block is a command to instruct write-in of information to a storage block 104 other than the CM attribute information storage block 104A among the plurality of storage blocks 104.

Figure 15:
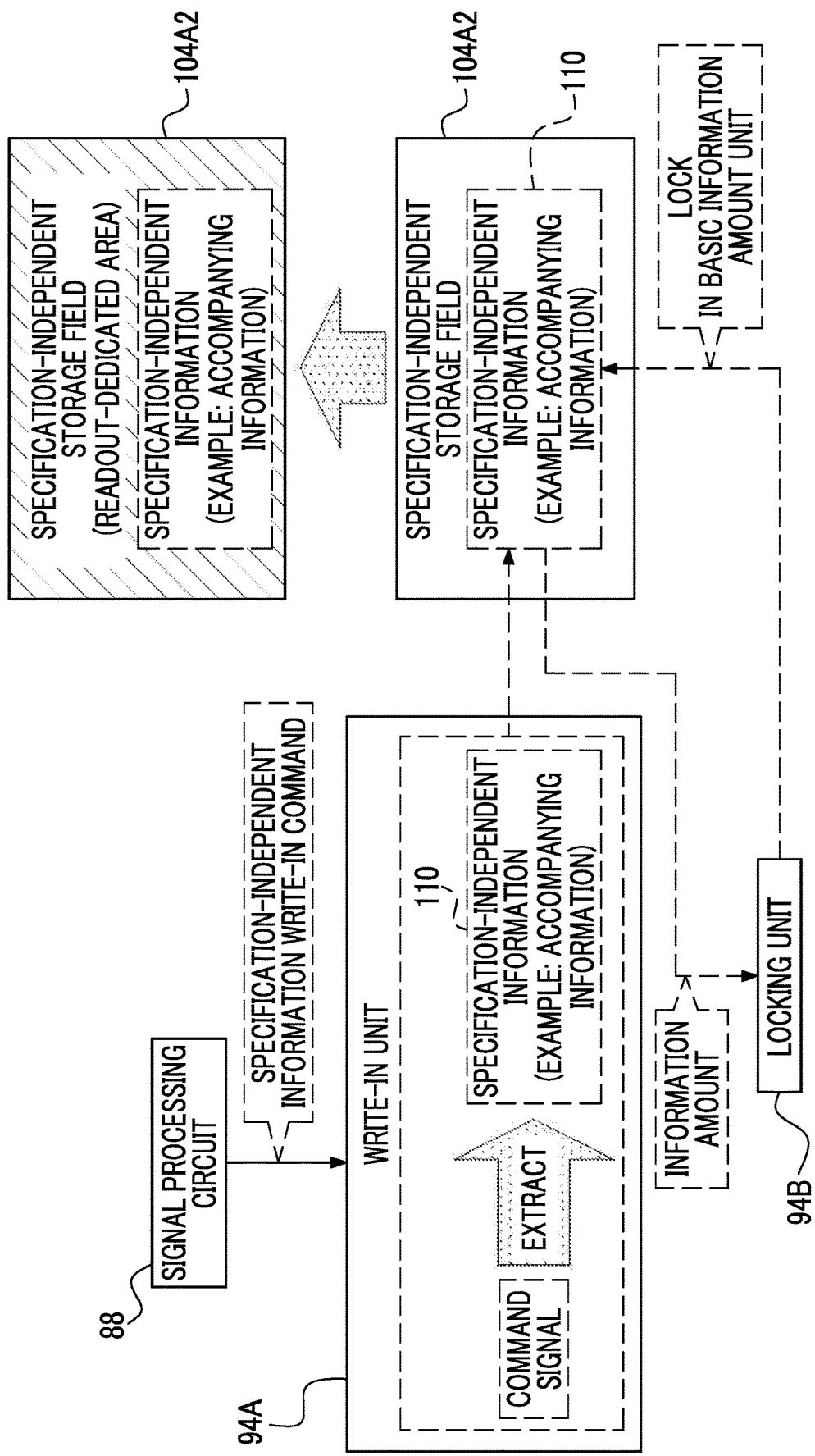
FIG. 15 is a block diagram showing an example of rough processing contents of a write-in unit.

In the present embodiment, as an example of the write-in command for a CM attribute information storage block, a specification-independent information write-in command is applied. As shown in FIG. 15 as an example, in a case where a write-in command indicated by the command signal input from the signal processing circuit 88 is the specification-independent information write-in command, the write-in unit 94A performs write-in to the specification-independent storage field 104A2 in response to the specification-independent information write-in command. In a case where a write-in command indicated by the command signal input to the write-in unit 94A is the specification-independent information write-in command, the specification-independent information 110 is included in the command signal. The write-in unit 94A extracts the specification-independent information 110 from the command signal and writes the extracted specification-independent information 110 in the specification-independent storage field 104A2.

The locking unit 94B locks an area in the CM attribute information storage block 104A where write-in by the write-in unit 94A is performed, in a basic information amount unit. The basic information amount unit is a byte unit. The locking unit 94B locks the area in the CM attribute information storage block 104A where write-in is performed, to generate a readout-dedicated area (see a hatched region shown in FIG. 15 as an example).

Here, as an example of the basic information amount unit, two bytes are applied. The two bytes are merely an example, and the basic information amount unit may be less than two bytes (for example, one byte) or may be an information amount unit (for example, three bytes) greater than two bytes. Here, although the basic information amount unit is specified in the byte unit, the technique of the present disclosure is not limited thereto, and the basic information amount unit may be specified in other units, such as a bit unit.

The locking unit 94B acquires an information amount of non-lock information from the specification-independent storage field 104A2. Here, the non-lock information indicates the specification-independent information 110 that is not fixed to the specification-independent storage field 104A2, out of the specification-independent information 110 stored in the specification-independent storage field 104A2. The specification-independent information 110 that is not fixed to the specification-independent storage field 104A2 means the specification-independent information 110 that is not locked in an unrewritable state.

The locking unit 94B locks non-lock information for a basic information amount (for example, non-lock information for two bytes) in an unrewritable state in a case where an information amount of non-lock information acquired from the specification-independent storage field 104A2 is equal to or greater than a basic information amount.

Figure 16:
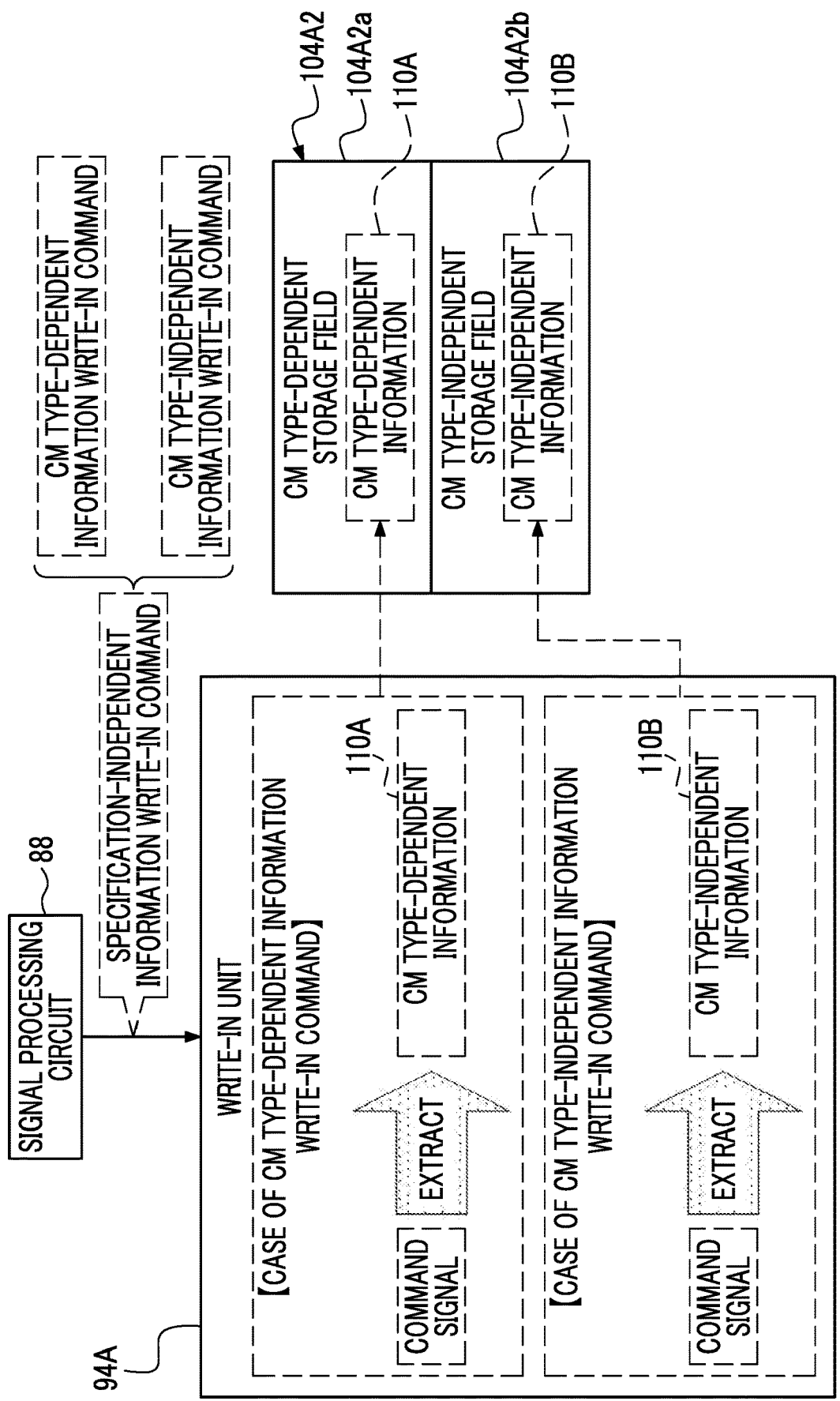
FIG. 16 is a block diagram showing an example of processing contents in a case where a CM type-dependent information write-in command is given to the write-in unit and an example of processing contents in a case where a CM type-independent information write-in command is given to the write-in unit.

As shown in FIG. 16 as an example, the specification-independent information write-in command is classified roughly into a CM type-dependent information write-in command and a CM type-independent information write-in command. The CM type-dependent information write-in command is a command to instruct write-in of the CM type-dependent information 110A to the CM type-dependent storage field 104A2a. The CM type-independent information write-in command is a command to instruct write-in of the CM type-independent information 110B to the CM type-independent storage field 104A2b.

Here, in a case where a write-in command indicated by the command signal is the CM type-dependent information write-in command, the write-in unit 94A performs write-in to the CM type-dependent storage field 104A2a in response to the CM type-dependent information write-in command. In a case where a write-in command indicated by the command signal input to the write-in unit 94A is the CM type-dependent information write-in command, the CM type-dependent information 110A is included in the command signal. The write-in unit 94A extracts the CM type-dependent information 110A from the command signal and writes the extracted CM type-dependent information 110A in the CM type-dependent storage field 104A2a.

In a case where a write-in command indicated by the command signal is the CM type-independent information write-in command, the write-in unit 94A performs write-in to the CM type-independent storage field 104A2b in response to the CM type-independent information write-in command. In a case where a write-in command indicated by the command signal input to the write-in unit 94A is the CM type-independent information write-in command, the CM type-independent information 110B is included in the command signal. The write-in unit 94A extracts the CM type-independent information 110B from the command signal and writes the extracted CM type-independent information 110B in the CM type-independent storage field 104A2b.

Next, the operations of a cartridge memory 19 according to a first embodiment will be described referring to FIG. 17.

Figure 17:
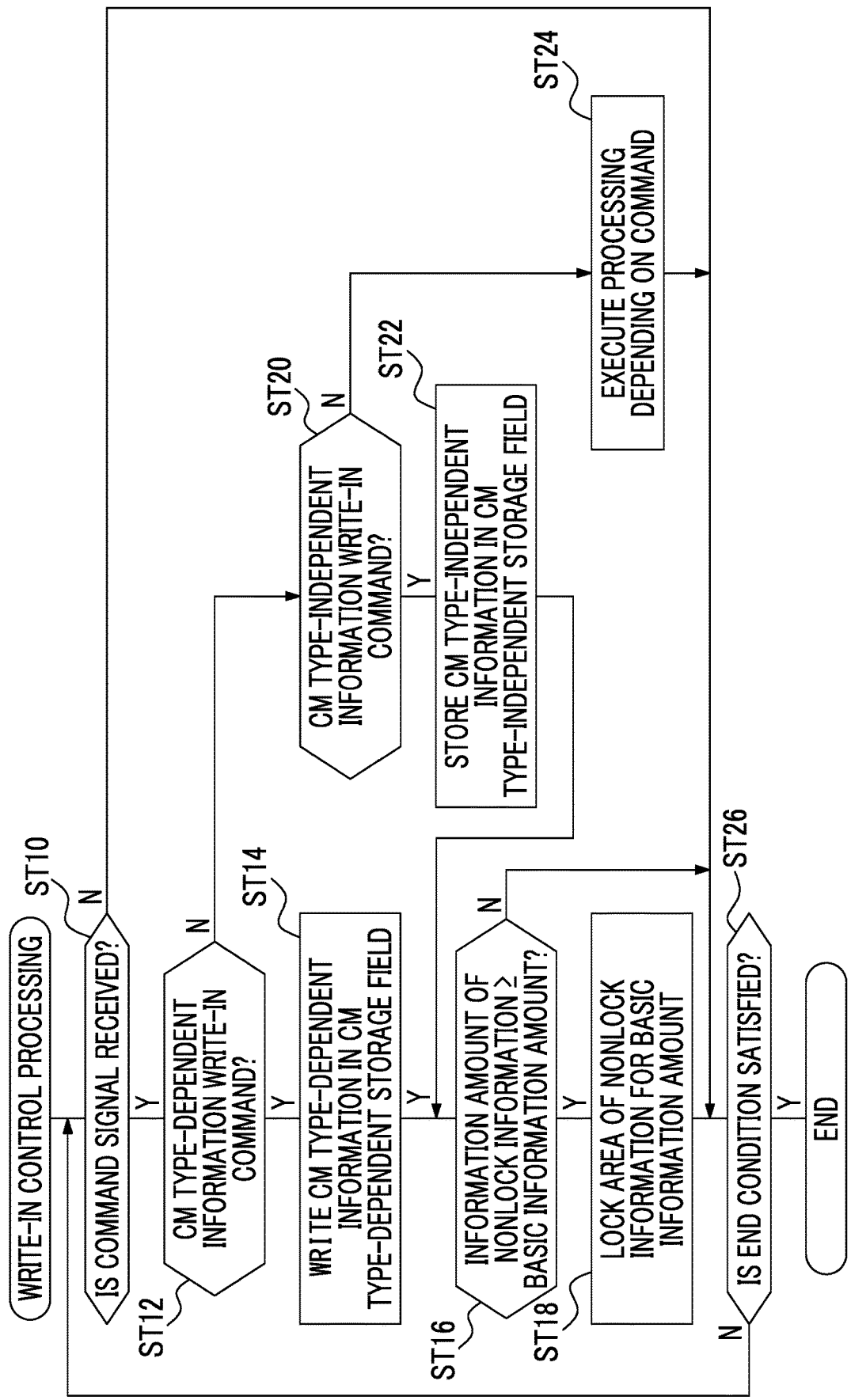
FIG. 17 is a flowchart illustrating an example of a flow of write-in control processing.

FIG. 17 shows an example of a flow of write-in control processing that is executed by the CPU 94 in the manufacturing process of the magnetic tape cartridge 10. The flow of the write-in control processing shown in FIG. 17 is an example of a "method for operating a noncontact communication medium" according to the technique of the present disclosure.

Here, although a form example where the write-in control processing is executed by the CPU 94 in the manufacturing process of the magnetic tape cartridge 10 has been described, the technique of the present disclosure is not limited thereto. For example, the write-in control processing may be executed by the CPU 94 in a work stage by the vendor of the magnetic tape cartridge 10, such as a stage where the magnetic tape cartridge 10 is inspected or a stage where the magnetic tape cartridge 10 is shipped.

In the following description of the write-in control processing of FIG. 17, for convenience of description, a case where the cartridge memory 19 is charged in the manufacturing process of the magnetic tape cartridge 10 in a state in which the specification-dependent storage field 104A1 is a readout-dedicated storage field and the specification-independent information 110 is not stored in the specification-independent storage field 104A2 will be described. In the following description of the write-in control processing of FIG. 17, for convenience of description, description will be provided on the premise that a command signal indicating a write-in command is transmitted from the noncontact reading and writing device 50 to the cartridge memory 19.

In the write-in control processing shown in FIG. 17, first, in Step ST10, the write-in unit 94A determines whether or not the command signal transmitted from the noncontact reading and writing device 50 is received by the signal processing circuit 88. In Step ST10, in a case where the command signal is not received by the signal processing circuit 88, determination is made to be negative, and the write-in control processing proceeds to Step ST26. In Step ST10, in a case where the command signal is received by the signal processing circuit 88, determination is made to be affirmative, and the write-in control processing proceeds to Step ST12.

In Step ST12, the write-in unit 94A determines whether or not the write-in command that is indicated by the command signal received by the signal processing circuit 88 in Step ST10 is the CM type-dependent information write-in command. In Step ST12, in a case where the write-in command that is indicated by the command signal received by the signal processing circuit 88 in Step ST10 is the CM type-dependent information write-in command, determination is made to be affirmative, the write-in control processing proceeds to Step ST14. In Step ST12, in a case where the write-in command that is indicated by the command signal received by the signal processing circuit 88 in Step ST10 is a write-in command other than the CM type-dependent information write-in command, determination is made to be negative, and the write-in control processing proceeds to Step ST20.

In Step ST14, the write-in unit 94A writes the CM type-dependent information 110A that is included in the command signal received by the signal processing circuit 88 in Step ST10, in the CM type-dependent storage field 104A2a, and thereafter, the write-in control processing proceeds to Step ST16.

In Step ST16, the locking unit 94B determines whether or not an information amount of non-lock information stored in the specification-independent storage field 104A2 is equal to or greater than the basic information amount. In Step ST16, in a case where the information amount of the non-lock information stored in the specification-independent storage field 104A2 is equal to or greater than the basic information amount, determination is made to be affirmative, and the write-in control processing proceeds to Step ST18. In Step ST16, in a case where the information amount of the non-lock information stored in the specification-independent storage field 104A2 is less than the basic information amount, determination is made to be negative, and the write-in control processing proceeds to Step ST26. Here, although a form example where the processing of Step ST16 is executed has been described, the technique of the present disclosure is established even though the processing of Step ST16 is not provided.

In Step ST18, the locking unit 94B locks non-lock information for the basic information amount in the non-lock information stored in the specification-independent storage field 104A2, and thereafter, the write-in control processing proceeds to Step ST26.

Here, although a form example where an area of the non-lock information for the basic information amount is locked in Step ST18 has been described, the technique of the present disclosure is not limited thereto. For example, instead of the processing of Step ST18, processing in which the entire area of the non-lock information written in the specification-independent storage field 104A2 in Step ST14 or ST22 is locked by the locking unit 94B may be executed. That is, each time write-in of the non-lock information is performed in Step ST14 or ST22, an area for a write-in amount of the non-lock information may be locked by the locking unit 94B. For example, in a case where write-in of non-lock information for two bytes is performed, an area of the non-lock information for the two bytes may be locked.

In Step ST20, the write-in unit 94A determines whether or not the write-in command that is indicated by the command signal received by the signal processing circuit 88 in Step ST10 is the CM type-independent information write-in command. In Step ST20, in a case where the write-in command that is indicated by the command signal received by the signal processing circuit 88 in Step ST10 is the CM type-independent information write-in command, determination is made to be affirmative, and the write-in control processing proceeds to Step ST22. In Step ST20, in a case where the write-in command that is indicated by the command signal received by the signal processing circuit 88 in Step ST10 is a write-in command other than the CM type-independent information write-in command, determination is made to be negative, and the write-in control processing proceeds to Step ST24.

In Step ST22, the write-in unit 94A writes the CM type-independent information 110B that is included in the command signal received by the signal processing circuit 88 in Step ST10, in the CM type-independent storage field 104A2b, and thereafter, the write-in control processing proceeds to Step ST16.

In Step ST24, the write-in unit 94A executes write-in processing depending on the write-in command that is indicated by the command signal received by the signal processing circuit 88 in Step ST10, and thereafter, the write-in control processing proceeds to Step ST26. Here, the write-in processing depending on the write-in command indicates a write-in command (for example, a write-in command for a normal storage block) other than a write-in command for a CM attribute information storage block.

In Step ST26, the write-in unit 94A determines whether or not a condition (hereinafter, referred to as a "write-in control processing end condition") for ending the write-in control processing is satisfied. Examples of the write-in control processing end condition include a condition that the magnetic field MF disappears or a condition that a command signal indicating a command to end the write-in control processing is transmitted from the noncontact reading and writing device 50 to the cartridge memory 19. Determination about whether or not the magnetic field MF disappears is performed by the CPU 94 based on the intensity of the magnetic field MF measured by a magnetic field intensity measurement circuit (not shown) capable of measuring the intensity of the magnetic field MF.

In Step ST26, in a case where the write-in control processing end condition is not satisfied, determination is made to be negative, and the write-in control processing proceeds to Step ST10. In Step ST26, in a case where the write-in control processing end condition is satisfied, determination is made to be affirmative, and the write-in control processing ends.

As described above, in the cartridge memory 19, the NVM 96 has the CM attribute information storage block 104A. The CM attribute information storage block 104A includes the specification-independent storage field 104A2 where the specification-independent information 110 is stored. Then, the specification-independent information 110 (for example, the accompanying information) is written in the specification-independent storage field 104A2 in response to the specification-independent information write-in command given from the noncontact reading and writing device 50 to the cartridge memory 19 by noncontact communication. Therefore, according to this configuration, compared to a case where the specification-independent information 110 is not stored in the CM attribute information storage block 104A where the CM attribute information is stored, it is possible to store many specification-independent information 110 in the NVM 96.

In the cartridge memory 19, an area in the CM attribute information storage block 104A where write-in is performed is locked by the locking unit 94B in the basic information amount unit. Therefore, according to this configuration, it is possible to widen an area to be locked in the CM attribute information storage block 104A, following a write-in amount little by little.

In the cartridge memory 19, an area in the CM attribute information storage block 104A where write-in is performed is locked by the locking unit 94B in a byte unit. Therefore, according to this configuration, it is possible to widen an area to be locked in the CM attribute information storage block 104A following a write-in amount in a byte unit.

In the cartridge memory 19, an area in the CM attribute information storage block 104A where write-in is performed is locked by the locking unit 94B, such that a readout-dedicated area is generated. Therefore, according to this configuration, it is possible to set only an area in the CM attribute information storage block 104A where write-in is performed, as a readout-dedicated area.

In the cartridge memory 19, the specification-dependent storage field 104A1 is made to be a readout-dedicated storage field. Therefore, according to this configuration, it is possible to store the specification-independent information 110 in the CM attribute information storage block 104A without influencing the specification-dependent information 108 stored in the specification-dependent storage field 104A1 in the CM attribute information storage block 104A.

In the cartridge memory 19, as described above, the specification-dependent storage field 104A1 is made to be a readout-dedicated storage field. The specification-dependent storage field 104A1 has the identifier storage field 104A1a, the error detection code storage field 104A1b, the storage capacity-related information storage field 104A1c, and the model-related information storage field 104A1d. Therefore, according to this configuration, it is possible to store the CM attribute information storage block 104A in the specification-independent information 110 without influencing information stored in the identifier storage field 104A1a, the error detection code storage field 104A1b, the storage capacity-related information storage field 104A1c, and the model-related information storage field 104A1d in the CM attribute information storage block 104A.

In the cartridge memory 19, as an example of the specification-independent information, the accompanying information is applied. The accompanying information is information regarding the magnetic tape cartridge 10. The content of the accompanying information is different for each request given to the magnetic tape cartridge 10 by the vendor of the magnetic tape cartridge 10. Therefore, according to this configuration, it is possible to store the accompanying information that is different in content for each request given to the magnetic tape cartridge 10, in the CM attribute information storage block 104A.

Figure 18:
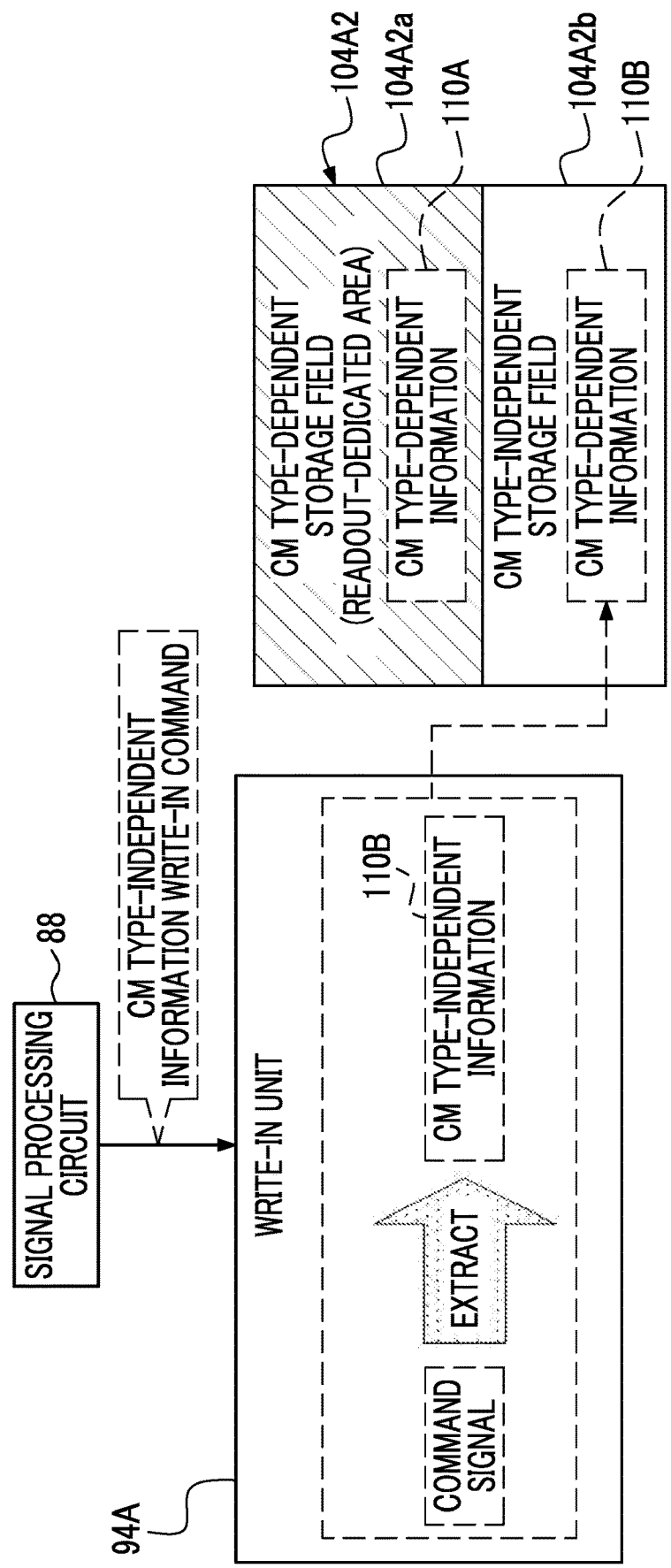
FIG. 18 is a block diagram showing an example of processing contents in which write-in is performed only in a CM type-independent storage field between the CM type-independent storage field and a CM type-dependent storage field by the write-in unit.

In the above-described first embodiment, although a form example where the write-in unit 94A writes the CM type-dependent information 110A in the CM type-dependent storage field 104A2a, and writes the CM type-independent information 110B in the CM type-independent storage field 104A2b has been described, the technique of the present disclosure is not limited thereto. For example, as shown in FIG. 18, the write-in unit 94A may write the specification-independent information 110, that is, the CM type-independent information 110B only in the CM type-independent storage field 104A2b between the CM type-dependent storage field 104A2a and the CM type-independent storage field 104A2b. In the example shown in FIG. 18, the CM type-dependent storage field 104A2a is made to be a readout-dedicated area. A timing at which the CM type-dependent storage field 104A2a is made to be a readout-dedicated area, that is, a timing at which the CM type-dependent storage field 104A2a is locked is, for example, the same timing as a timing at which the specification-dependent storage field 104A1 is locked. The CM type-dependent storage field 104A2a is locked by the vendor of the cartridge memory 19, for example, in a stage before the vendor of the magnetic tape cartridge 10 obtains the cartridge memory 19 (for example, a stage before the cartridge memory 19 is charged in the manufacturing process of the magnetic tape cartridge 10).

Figure 19:
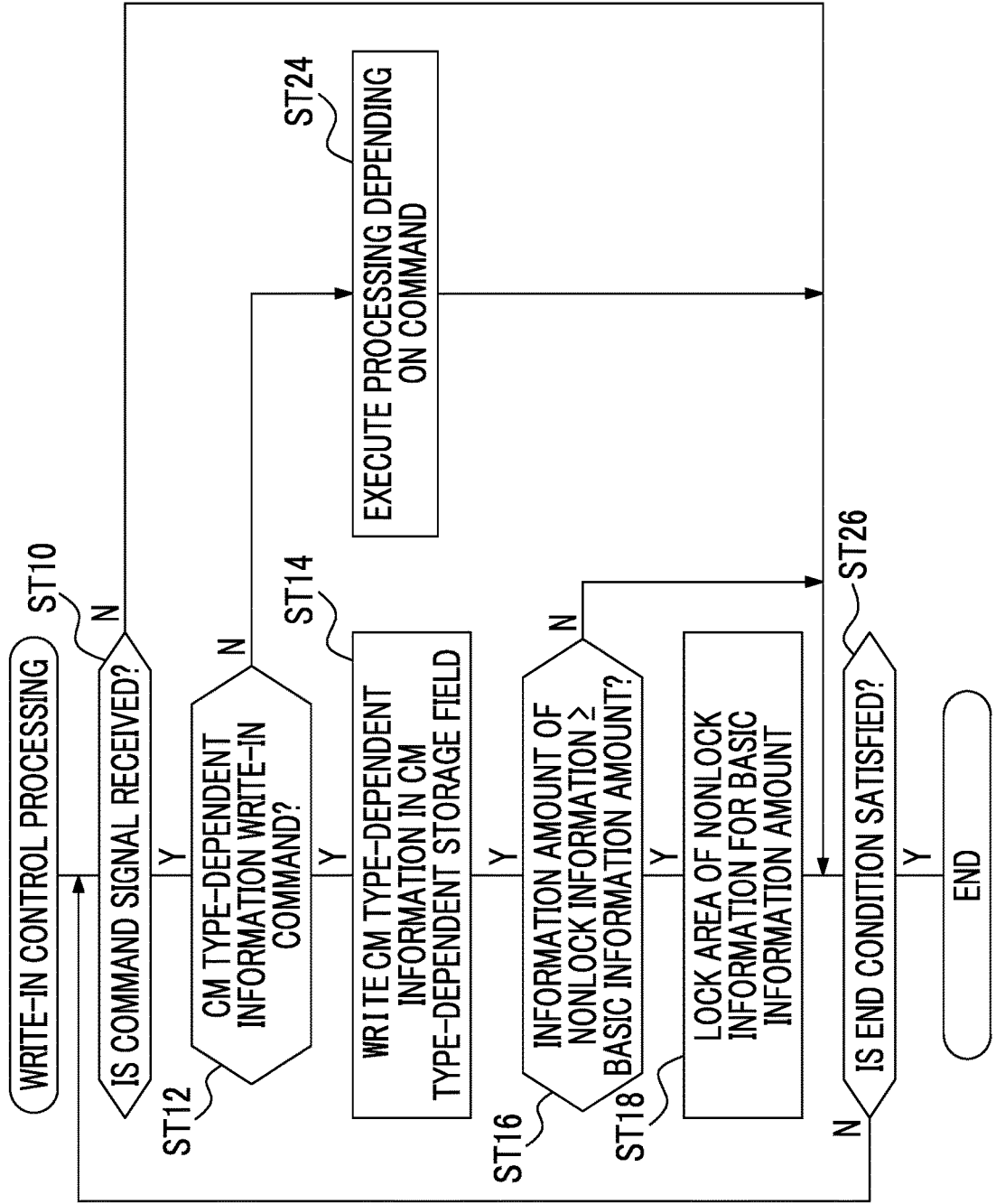
FIG. 19 is a flowchart illustrating an example of a flow of write-in control processing in a case where write-in is performed only in the CM type-independent storage field between the CM type-independent storage field and the CM type-dependent storage field by the write-in unit.

In a case where the specification-independent information 110 is allowed to be written only in the CM type-independent storage field 104A2b between the CM type-dependent storage field 104A2a and the CM type-independent storage field 104A2b, write-in control processing shown in FIG. 19 as an example is executed by the CPU 94. A flowchart shown in FIG. 19 is different from the flowchart shown in FIG. 17 in that the processing of each of Steps ST20 and ST22 shown in FIG. 17 is not provided. That is, in the example shown in FIG. 19, in Step ST12, in a case where determination is made to be negative, the write-in control processing proceeds to Step ST24.

In this way, in the examples shown in FIGS. 18 and 19, the specification-independent information 110 is written only in the CM type-independent storage field 104A2b between the CM type-dependent storage field 104A2a and the CM type-independent storage field 104A2b. Then, the CM type-dependent storage field 104A2a is made to be a readout-dedicated area. Therefore, according to this configuration, it is possible to store the specification-independent information 110 (in the example shown in FIG. 18, the CM type-independent information 110B) in the specification-independent storage field 104A2 without influencing the CM type-dependent information 110A stored in the CM type-dependent storage field 104A2a in the specification-independent storage field 104A2.

The technique of the present disclosure is not limited to the above-described configuration. For example, a part of the configuration may be deleted as necessary or a configuration other than the configuration may be added as necessary.

Second Embodiment

In the above-described first embodiment, although a form example where the basic information amount unit in which the non-lock information is locked is fixed has been described, in a second embodiment, a form example where the basic information amount unit fluctuates will be described. In the second embodiment, the same components as those in the above-described first embodiment are represented by the same reference numerals, and description thereof will not be repeated. In the second embodiment, portions different from the above-described first embodiment will be primarily described.

Figure 20:
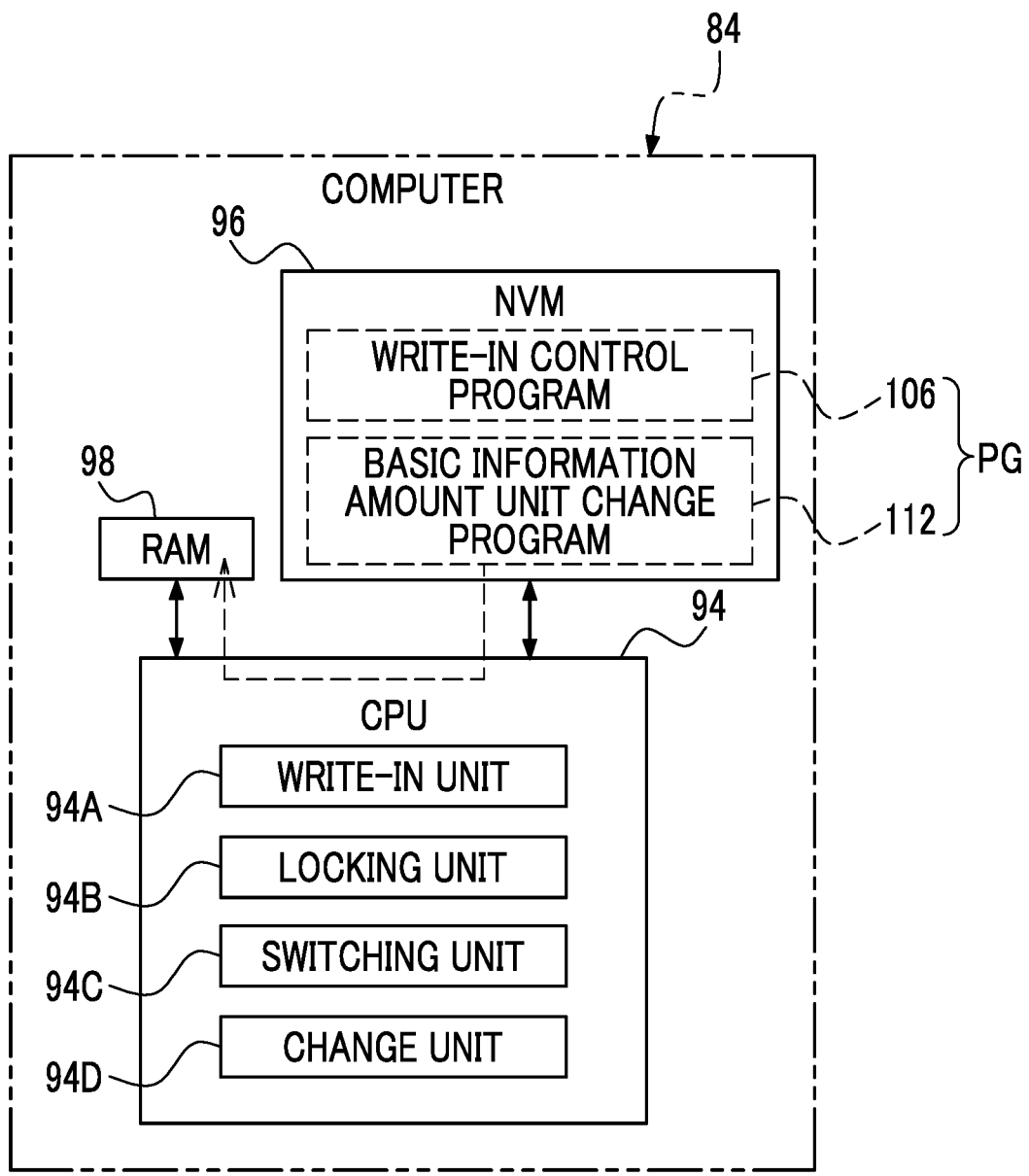
FIG. 20 is a block diagram showing an example of a main function of the CPU that is realized with execution of the write-in control program according to the first embodiment by the CPU of the cartridge memory.

As shown in FIG. 20 as an example, in addition to the write-in control program 106, a basic information amount unit change program 112 is stored in the NVM 96. Hereinafter, for convenience of description, the write-in control program 106 and the basic information amount unit change program 112 are referred to as a "program PG" unless otherwise necessary to distinguish therebetween.

The CPU 94 reads out the basic information amount unit change program 112 from the NVM 96 and executes the read-out basic information amount unit change program 112 on the RAM 98. The CPU 94 operates as a switching unit 94C and a change unit 94D following the basic information amount unit change program 112 that is executed on the RAM 98, thereby executing basic information amount unit change processing (see FIG. 22) described below. Hereinafter, for convenience of description, the write-in control processing and the basic information amount unit change processing are also referred to as "cartridge memory-side processing" unless otherwise necessary to distinguish therebetween.

As shown in FIG. 21 as an example, a flag setting region 104B is provided in the NVM 96. In the flag setting region 104B, a flag (hereinafter, simply referred to as a "flag") indicating limitation to change of the basic information amount unit is set.

Hereinafter, setting the flag is also referred to "turn on flag", and releasing a set state of the flag is also referred to as "turn off flag". Here, although a form example where the flag setting region 104B is provided in the NVM 96 has been described, the technique of the present disclosure is not limited thereto, and the flag setting region 104B may be provided in the RAM 98 or an internal memory (not shown) of the CPU 94.

A command signal indicating a flag-on command, a command signal indicating a flag-off command, and a command signal indicating a basic information amount unit change command are selectively input to the CPU 94 from the signal processing circuit 88. The flag-on command is a command to instruct turn-on of the flag. The flag-off command is a command to instruct turn-off of the flag. The basic information amount unit change command is a command to instruct change of the basic information amount unit. Hereinafter, for convenience of description, the flag-on command and the flag-off command are also referred to as a "flag switching command" unless otherwise necessary to distinguish therebetween.

The switching unit 94C switches between on and off of the flag in the flag setting region 104B in response to the flag switching command given from the signal processing circuit 88. The flag is fixed to on by the switching unit 94C such that the flag is not switched from on to off after being switched from off to on.

The switching unit 94C turns on the flag in the flag setting region 104B in a case where the flag-on command is given in a state in which the flag is off. The switching unit 94C turns off the flag in the flag setting region 104B in a case where the flag-off command is given in a state in which the flag is on and the flag is not fixed to one. Here, an example of a state in which the flag is on and the flag is not fixed to on is a state at the time of an initial setting in which the flag is on.

The change unit 94D changes the basic information amount unit in response to the basic information amount unit change command. The change unit 94D changes the basic information amount unit to limitless in a case where the flag in the flag setting region 104B is off. That is, in a case where the flag in the flag setting region 104B is off, a change range of the basic information amount unit is limitless, and the change unit 94D changes the basic information amount unit that is used in the locking unit 94B, to a basic information amount unit depending on the basic information amount unit change command.

The change unit 94D changes the basic information amount unit with a current value of the basic information amount unit that is used in the locking unit 94, as a lower limit in a case where the flag in the flag setting region 104B is on. That is, in a case where the flag in the flag setting region 104B is on, the change range of the basic information amount unit is limited with the current value of the basic information amount unit that is used in the locking unit 94 as the lower limit, and the change unit 94D changes the basic information amount unit that is used in the locking unit 94B, to the basic information amount unit depending on the basic information amount unit change command within a limited range.

For example, in a case where the current value of the basic information amount unit that is used in the locking unit 94B is two bytes, even though change to a basic information amount unit of one byte is instructed by the basic information amount unit change command, the change unit 94D maintains the two-byte unit of the basic information amount unit that is used in the locking unit 94B. In a case where the current value of the basic information amount unit that is used in the locking unit 94B is two bytes, and change to a basic information amount unit of three bytes is instructed by the basic information amount unit change command, the change unit 94D changes the basic information amount unit that is used in the locking unit 94B, from a two-byte unit to a three-byte unit.

The locking unit 94B locks the non-lock information in the specification-independent information 110 that is stored in the specification-independent storage field 104A2, in the basic information amount unit changed by the change unit 94D.

Next, the operations of the cartridge memory 19 according to the second embodiment will be described referring to FIGS. 22A and 22B.

Figure 22A:
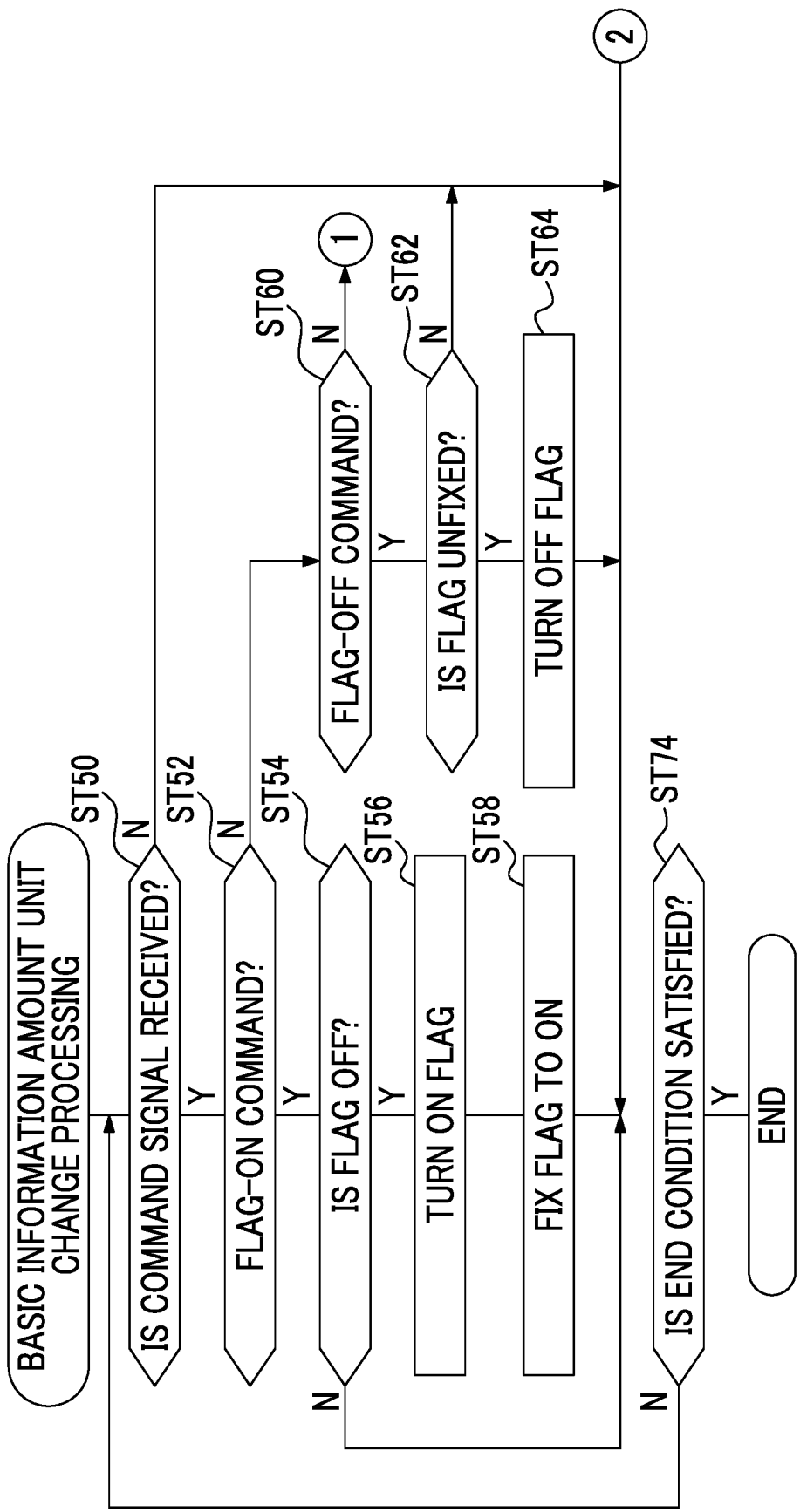
FIG. 22A is a flowchart illustrating an example of a flow of basic information amount unit change processing.
Figure 22B:
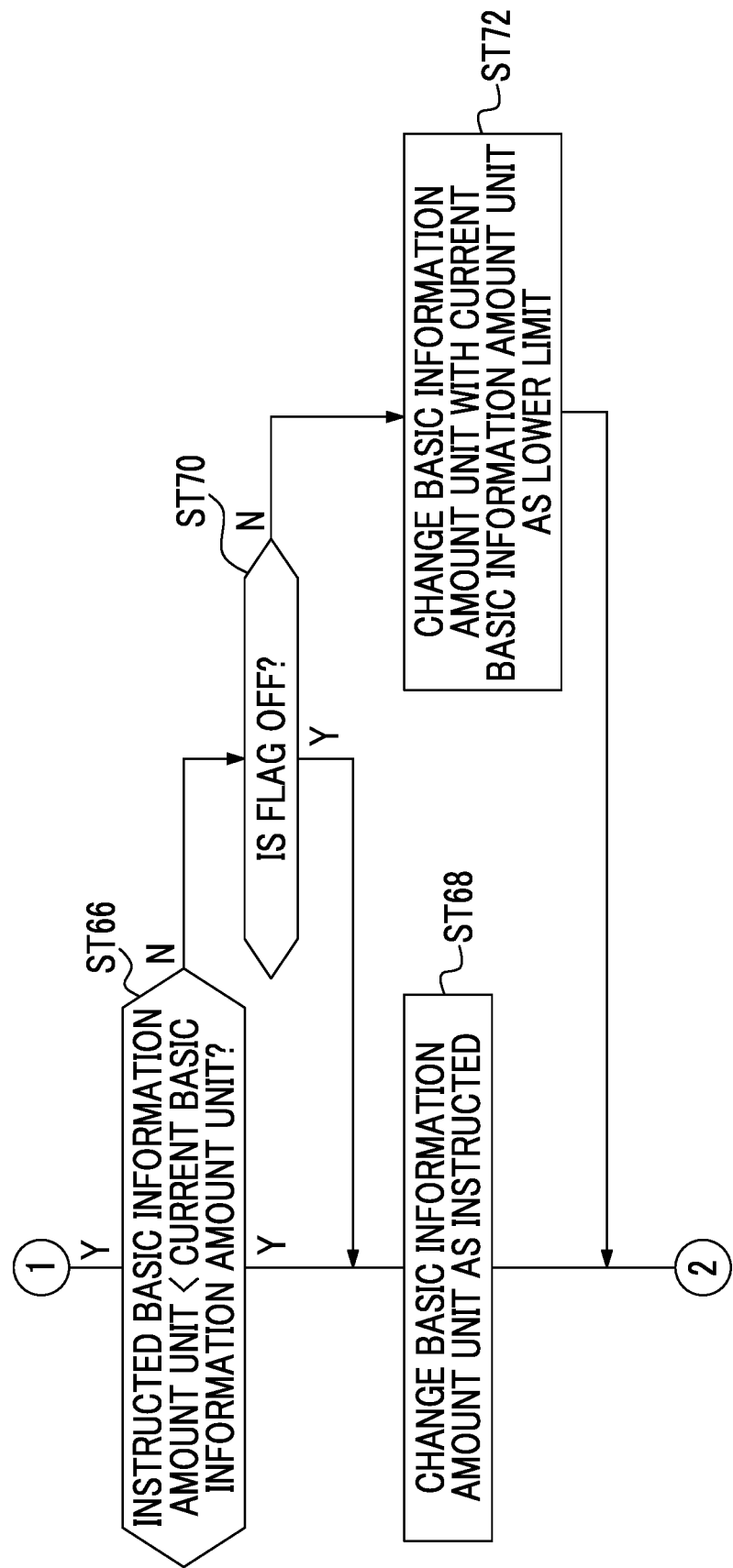
FIG. 22B is a continuation of the flowchart shown in FIG. 22A.

FIGS. 22A and 22B show an example of a flow of the basic information amount unit change processing that is executed by the CPU 94 in the manufacturing process of the magnetic tape cartridge 10.

In the following description of the basic information amount unit change processing of FIGS. 22A and 22B, for convenience of description, description will be provided on the premise that the command signal indicating the flag-on command, the command signal indicating the flag-off command, and the command signal indicating the basic information amount unit change command are selectively transmitted from the noncontact reading and writing device 50 to the cartridge memory 19.

In the basic information amount unit change processing shown in FIG. 22A, first, in Step ST50, the switching unit 94C determines whether or not the command signal transmitted from the noncontact reading and writing device 50 is received by the signal processing circuit 88. In Step ST50, in a case where the command signal is not received by the signal processing circuit 88, determination is made to be negative, and the basic information amount unit change processing proceeds to Step ST74. In Step ST50, in a case where the command signal is received by the signal processing circuit 88, determination is made to be affirmative, and the basic information amount unit change processing proceeds to Step ST52.

In Step ST52, the switching unit 94C determines whether or not the command that is indicated by the command signal received by the signal processing circuit 88 in Step ST50 is the flag-on command. In Step ST52, in a case where the command that is indicated by the command signal received by the signal processing circuit 88 in Step ST50 is not the flag-on command, determination is made to be negative, and the basic information amount unit change processing proceeds to Step ST60. In Step ST52, in a case where the command that is indicated by the command signal received by the signal processing circuit 88 in Step ST50 is the flag-on command, determination is made to be affirmative, and the basic information amount unit change processing proceeds to Step ST54.

In Step ST54, the switching unit 94C determines whether or not the flag in the flag setting region 104B is turned off. In Step ST54, in a case where the flag in the flag setting region 104B is turned on, determination is made to be negative, and the basic information amount unit change processing proceeds to Step ST74. In Step ST54, in a case where the flag in the flag setting region 104B is turned off, determination is made to be affirmative, and the basic information amount unit change processing proceeds to Step ST56.

In Step ST56, the switching unit 94C turns on the flag in the flag setting region 104B, and thereafter, the basic information amount unit change processing proceeds to Step ST58.

In Step ST58, the switching unit 94C fixes the flag in the flag setting region 104B to on, and thereafter, the basic information amount unit change processing proceeds to Step ST74.

In Step ST60, the switching unit 94C determines whether or not the command that is indicated by the command signal received by the signal processing circuit 88 in Step ST50 is the flag-off command. In Step ST60, in a case where the command that is indicated by the command signal received by the signal processing circuit 88 in Step ST50 is not the flag-off command (in a case where the command is the basic information amount unit change command), determination is made to be negative, and the basic information amount unit change processing proceeds to Step ST66 shown in FIG. 22B. In Step ST60, in a case where the command that is indicated by the command signal received by the signal processing circuit 88 in Step ST50 is the flag-off command, determination is made to be affirmative, and the basic information amount unit change processing proceeds to Step ST62.

In Step ST72, the switching unit 94C determines whether or not the flag in the flag setting region 104B is unfixed. In Step ST72, in a case where the flag in the flag setting region 104B is fixed, determination is made to be negative, and the basic information amount unit change processing proceeds to Step ST74. In Step ST72, in a case where the flag in the flag setting region 104B is not fixed, determination is made to be affirmative, and the basic information amount unit change processing proceeds to Step ST64.

In Step ST64, the switching unit 94C turns off the flag in the flag setting region 104B, and thereafter, the basic information amount unit change processing proceeds to Step ST74.

In Step ST66 shown in FIG. 22B, the change unit 94D determines whether or not the basic information amount unit instructed by the basic information amount unit change command that is indicated by the command signal received by the signal processing circuit 88 in Step ST50 is smaller than the basic information amount unit that is currently used by the locking unit 94B. In Step ST66, in a case where the basic information amount unit instructed by the basic information amount unit change command that is indicated by the command signal received by the signal processing circuit 88 in Step ST50 is equal to or greater than the basic information amount unit that is currently used by the locking unit 94B, determination is made to be negative, and the basic information amount unit change processing proceeds to Step ST70. In Step ST66, in a case where the basic information amount unit instructed by the basic information amount unit change command that is indicated by the command signal received by the signal processing circuit 88 in Step ST50 is smaller than the basic information amount unit that is currently used by the locking unit 94B, determination is made to be affirmative, and the basic information amount unit change processing proceeds to Step ST68.

In Step ST68, the change unit 94D changes the basic information amount unit that is currently used by the locking unit 94B, as instructed. That is, the change unit 94D changes the basic information amount unit that is currently used by the locking unit 94B, to the basic information amount unit instructed by the basic information amount unit change command that is indicated by the command signal received by the signal processing circuit 88 in Step ST50. After the processing of Step ST68 is executed, the basic information amount unit change processing proceeds to Step ST74 shown in FIG. 22A.

In Step ST70, the change unit 94D determines whether or not the flag in the flag setting region 104B is off. In Step ST70, in a case where the flag in the flag setting region 104B is off, determination is made to be affirmative, and the basic information amount unit change processing proceeds to Step ST68. In Step ST70, in a case where the flag in the flag setting region 104B is on, determination is made to be negative, and the basic information amount unit change processing proceeds to Step ST72.

In Step ST72, the change unit 94D changes the basic information amount unit with the current basic information amount unit as a lower limit. That is, the change unit 94D changes the basic information amount unit that is currently used by the locking unit 94B, to the basic information amount unit instructed by the basic information amount unit change command that is indicated by the command signal received by the signal processing circuit 88 in Step ST10, with the basic information amount unit that is currently used by the locking unit 94B, as the lower limit. After the processing of Step ST72 is executed, the basic information amount unit change processing proceeds to Step ST74 shown in FIG. 22A.

In Step ST74 shown in FIG. 22A, the change unit 94D determines whether or not a condition (hereinafter, referred to as a "basic information amount unit change processing end condition") for ending the basic information amount unit change processing is satisfied. Examples of the basic information amount unit change processing end condition include a condition that the magnetic field MF disappears or a condition that the command signal indicating a command to end the basic information amount unit change processing is transmitted from the noncontact reading and writing device 50 to the cartridge memory 19. Determination about whether or not the magnetic field MF disappears is performed by the CPU 94 based on the intensity of the magnetic field MF measured by a magnetic field intensity measurement circuit (not shown) capable of measuring the intensity of the magnetic field MF.

In Step ST74, in a case where the basic information amount unit change processing end condition is not satisfied, determination is made to be negative, and the basic information amount unit change processing proceeds to Step ST50. In Step ST74, in a case where the basic information amount unit change processing end condition is satisfied, determination is made to be affirmative, and the basic information amount unit change processing ends.

As described above, in the second embodiment, in a case where the flag is turned off, the basic information amount unit is changed to limitless, and in a case where the flag is turned on, the basic information amount unit is changed with the current value of the basic information amount unit as the lower limit. Therefore, according to this configuration, it is possible to change the extent of the area to be locked in the specification-independent storage field 104A2.

In the second embodiment, the flag is fixed to on such that the flag is not switched from on to off after being switched from off to on. Therefore, according to this configuration, it is possible to inhibit the non-lock information written once from being rewritten in a unit less than the currently set basic information amount unit.

The technique of the present disclosure is not limited to the configuration described in the above-described second embodiment. For example, a part of the configuration may be deleted as necessary or a configuration (for example, the configuration of the embodiment described referring to FIGS. 1 to 19) other than the configuration may be added as necessary.

In each embodiment described above, although a form example where the non-lock information is locked in the basic information amount unit has been described, the technique of the present disclosure is not limited thereto. For example, an area in the CM attribute information storage block 104A (for example, the specification-independent storage field 104A2) where write-in of a value other than an initial value (for example, 00) is performed may be locked by the locking unit 94B.

Figure 23:
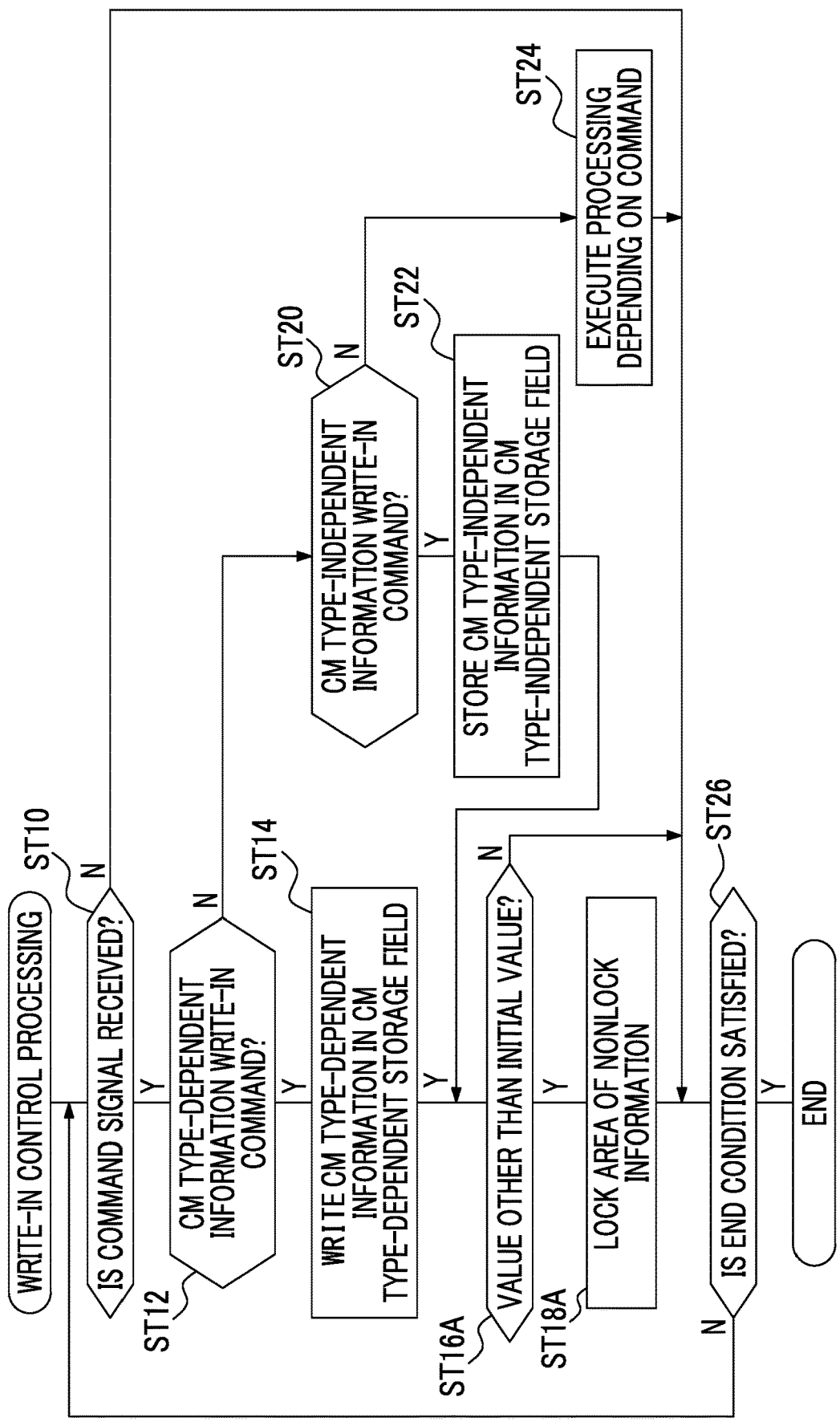
FIG. 23 is a flowchart illustrating a modification example of the flow of the write-in control processing.

In this case, for example, write-in control processing shown in FIG. 23 is executed by the CPU 94. A flowchart shown in FIG. 23 is different from the flowchart shown in FIG. 17 in that Step ST16A is provided instead of Step ST16, and Step ST18A is provided instead of Step ST18.

In Step ST16A, the locking unit 94B determines whether or not the non-lock information written in the specification-independent storage field 104A2 in Step ST14 or ST22 is a value other than the initial value. In Step ST16A, in a case where the non-lock information written in the specification-independent storage field 104A2 in Step ST14 or ST22 is the initial value, determination is made to be negative, and the write-in control processing proceeds to Step ST26. In Step ST16A, in a case where the non-lock information written in the specification-independent storage field 104A2 in Step ST14 or ST22 is a value other than the initial value, determination is made to be affirmative, and the write-in control processing proceeds to Step ST18A.

In Step ST18A, the locking unit 94B locks an area of the non-lock information written in the specification-independent storage field 104A2 in Step ST14 or ST22, and thereafter, the write-in control processing proceeds to Step ST26.

In this way, the area in the CM attribute information storage block 104A where write-in of a value other than the initial value is locked by the locking unit 94B, whereby it is possible to widen the area to be locked in the storage block 104 following a write-in amount of the non-lock information.

The technique of the present disclosure is not limited to the example shown in FIG. 23, that is, the configuration in which the area in the CM attribute information storage block 104A where write-in of a value other than the initial value is performed is locked by the locking unit 94B. For example, a part of the configuration may be deleted as necessary or a configuration (for example, the configuration of the embodiment described referring to FIGS. 1 to 22) other than the configuration may be added as necessary.

In each embodiment described above, although a form example where the area in the specification-independent storage field 104A2 is locked has been described, the technique of the present disclosure is not limited thereto. For example, first, write-in may be performed to the specification-dependent storage field 104A1, next, write-in may be performed to the specification-independent storage field 104A2, and areas where write-in is performed may be locked by the locking unit 94B in an order in which write-in is performed. In this case, a form example where write-in is performed by the write-in unit 94A in order from a head address to a trail address of the CM attribute information storage block 104A, and an area of the head address to an area of the trail address are locked sequentially by the locking unit 94B is considered.

In more detail, for example, the write-in unit 94A performs write-in in order from the head address of the CM attribute information storage block 104A, and the locking unit 94B locks an area that is specified from an address in the CM attribute information storage block 104A where write-in of a value other than the initial value is performed.

In this case, as a write-in command that is indicated by the command signal, in addition to the specification-dependent information write-in command, the specification-independent information write-in command is given from the signal processing circuit 88 to the write-in unit 94A. The write-in unit 94A performs write-in to the specification-dependent storage field 104A1 in response to the specification-dependent information write-in command. The specification-dependent information write-in command is an identifier write-in command, an error detection code write-in command, a storage capacity-related information write-in command, and a model-related information write-in command.

Figure 24:
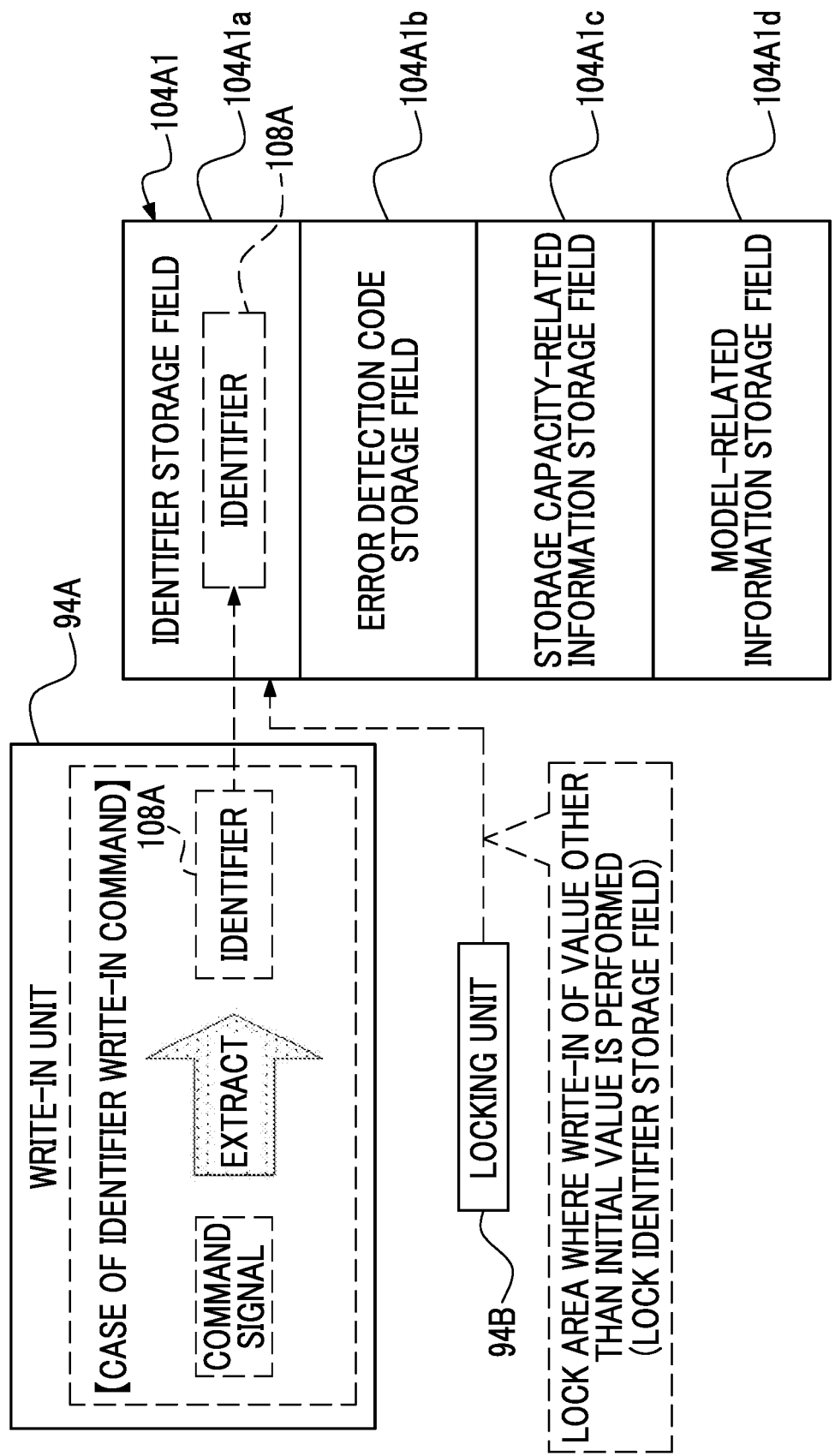
FIG. 24 is a block diagram showing a form example where an identifier is written in a identifier storage field by the write-in unit and the identifier storage field is locked by a locking unit.

As shown in FIG. 24 as an example, in a case where the specification-dependent information write-in command that is indicated by the command signal input to the write-in unit 94A is the identifier write-in command, the identifier 108A is included in the command signal. In this case, the write-in unit 94A extracts the identifier 108A from the command signal and writes the extracted identifier 108A in the identifier storage field 104A1*a*. Here, the locking unit 94B locks an area (in the example shown in FIG. 24, the identifier storage field 104A1*a*) where write-in of a value other than the initial value is performed. In the example shown in FIG. 24, since the identifier storage field 104A1*a* is locked, the identifier storage field 104A1*a* is changed to a readout-dedicated area where information is unrewritable.

Figure 25:
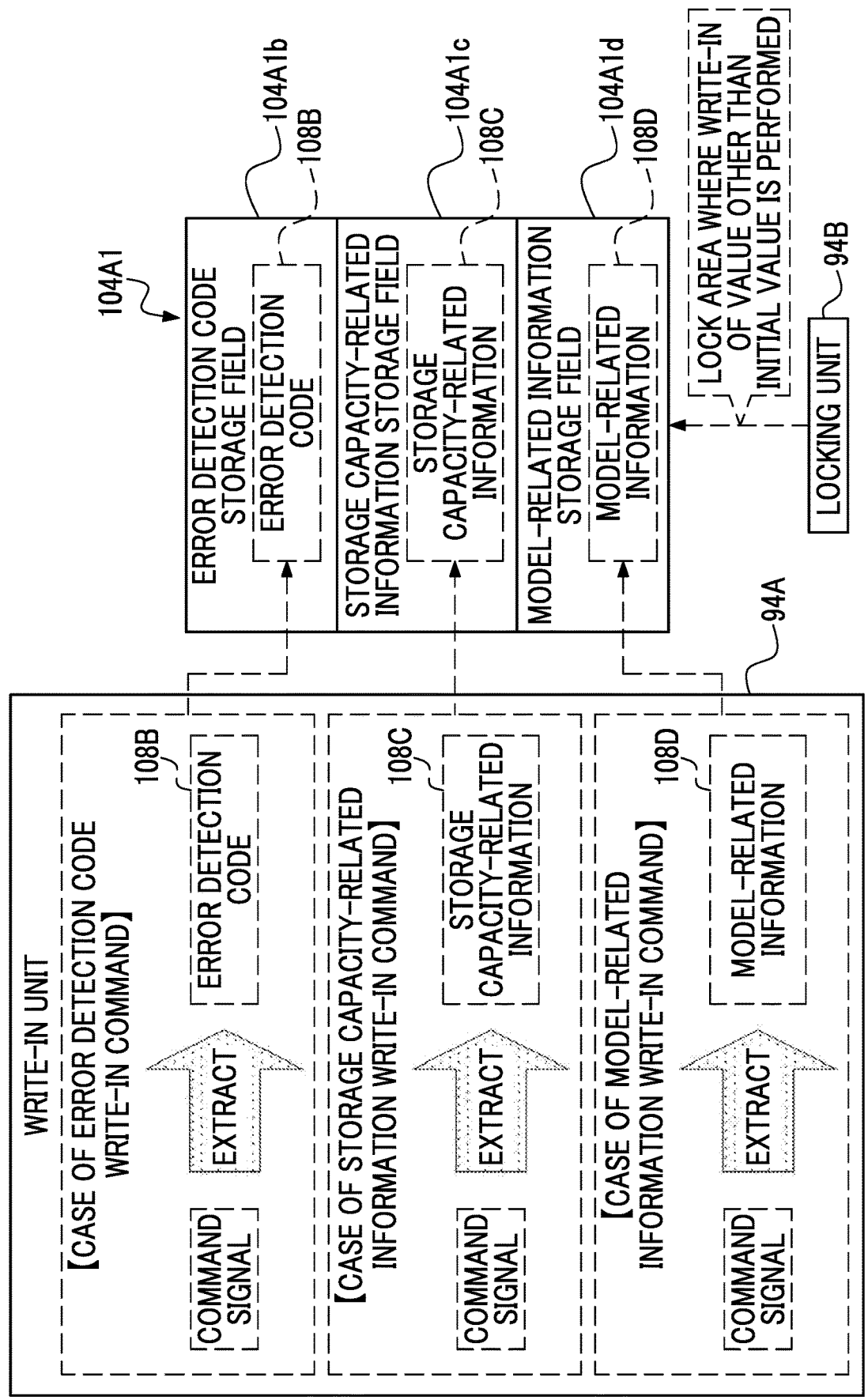
FIG. 25 is a block diagram showing a form example where write-in is performed in an error detection code storage field, a storage capacity-related information storage field, and a model-related information storage field by the write-in unit and each storage field is locked by the locking unit.

As shown in FIG. 25 as an example, in a case where the specification-dependent information write-in command that is indicated by the command signal input to the write-in unit 94A is the error detection code write-in command, the write-in unit 94A calculates the error detection code 108B for the identifier 108A and writes the calculated error detection code 108B in the error detection code storage field 104A1b. Here, the locking unit 94B locks an area (in the example shown in FIG. 25, the error detection code storage field 104A1b) where write-in of a value other than the initial value is performed. In the example shown in FIG. 25, since the error detection code storage field 104A1b is locked, the error detection code storage field 104A1b is changed to a readout-dedicated area where information is unrewritable.

In a case where the specification-dependent information write-in command that is indicated by the command signal input to the write-in unit 94A is the storage capacity-related information write-in command, the storage capacity-related information 108C is included in the command signal. In this case, the write-in unit 94A extracts the storage capacity-related information 108C from the command signal and writes the extracted storage capacity-related information 108C in the storage capacity-related information storage field 104A1c. Here, the locking unit 94B locks an area (in the example shown in FIG. 25, the storage capacity-related information storage field 104A1c) where write-in of a value other than the initial value is performed. In the example shown in FIG. 25, since the storage capacity-related information storage field 104A1c is locked, the storage capacity-related information storage field 104A1c is changed to a readout-dedicated area where information is unrewritable.

In a case where the specification-dependent information write-in command that is indicated by the command signal input to the write-in unit 94A is the model-related information write-in command, the model-related information 108D is included in the command signal. In this case, the write-in unit 94A extracts the model-related information 108D from the command signal and writes the extracted model-related information 108D in the model-related information storage field 104A1d. Here, the locking unit 94B locks an area (in the example shown in FIG. 25, the model-related information storage field 104A1d) where write-in of a value other than the initial value is performed. In the example shown in FIG. 25, since the model-related information storage field 104A1d is locked, the model-related information storage field 104A1d is changed to a readout-dedicated area where information is unrewritable.

In this way, write-in is performed in order from the head address of the CM attribute information storage block 104A, and an area that is specified from an address in the CM attribute information storage block 104A where write-in of a value other than the initial value is performed is locked by the locking unit 94B, whereby it is possible to lock only an area in the CM attribute information storage block 104A where write-in is performed.

The technique of the present disclosure is not limited to the examples shown in FIGS. 24 and 25, that is, the configuration in which write-in is performed in order from the head address of the CM attribute information storage block 104A, and an area that is specified from an address in the CM attribute information storage block 104A where write-in of a value other than the initial value is performed is locked by the locking unit 94B. For example, a part of the configuration may be deleted as necessary or a configuration (for example, the configuration of the embodiment described referring to FIGS. 1 to 23) other than the configuration may be added as necessary.

Figure 26:
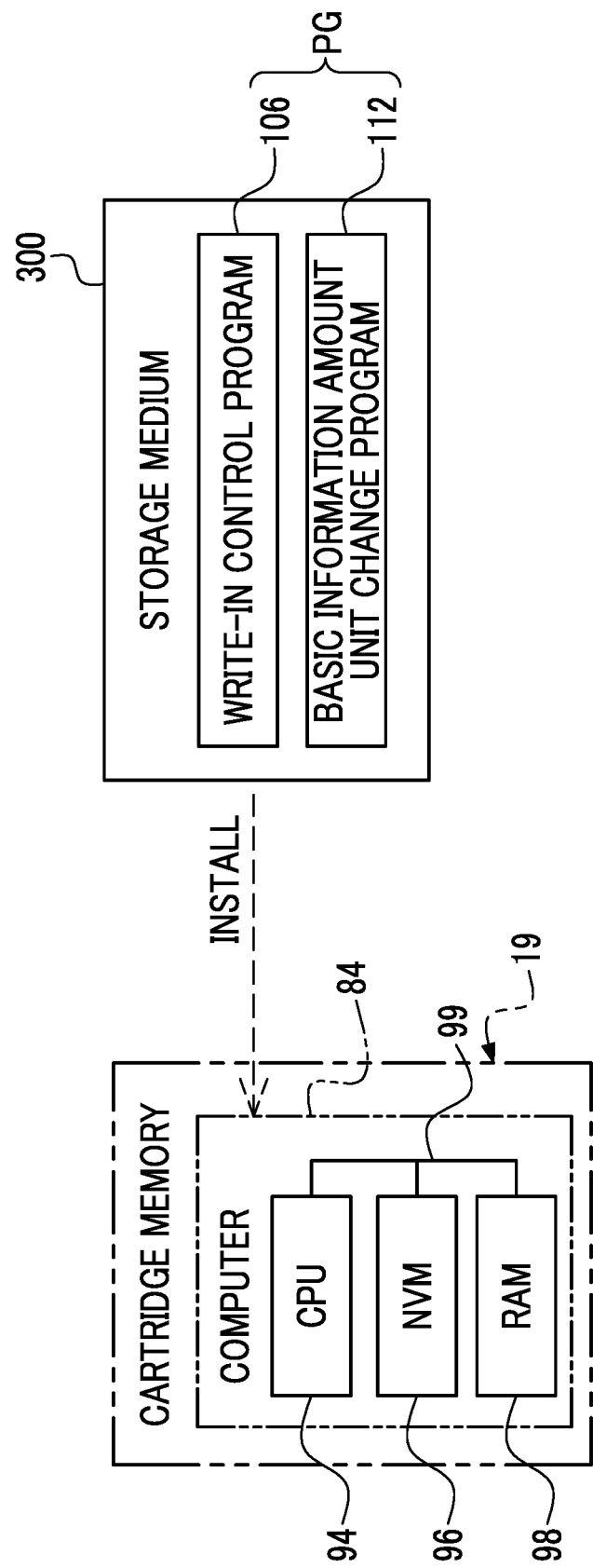
FIG. 26 is a block diagram showing an example of an aspect in which a program is installed on a computer from a storage medium storing the program.

In the above-described first embodiment, although a form example where the write-in control program 106 is stored in the NVM 96 has been described, the technique of the present disclosure is not limited thereto. For example, as shown in FIG. 26, the write-in control program 106 may be stored in a storage medium 300. In the above-described second embodiment, although a form example where the basic information amount unit change program 112 is stored in the NVM 96 has been described, the technique of the present disclosure is not limited thereto. For example, as shown in FIG. 26, the basic information amount unit change program 112 may be stored in the storage medium 300.

The storage medium 300 is a non-transitory storage medium. An example of the storage medium 300 is any portable storage medium, such as an SSD or a USB memory. The program PG that is stored in the storage medium 300 is installed on the computer 84. The CPU 94 executes the cartridge memory-side processing following the program PG In an example shown in FIG. 26, the CPU 94 is a single CPU, but may be a plurality of CPUs.

The program PG may be stored in a storage unit of another computer, a server apparatus, or the like that is connected to the computer 84 through a communication network (not shown), and the program PG may be downloaded depending on a request from the cartridge memory 19 and may be installed on the computer 84.

In the example shown in FIG. 26, although the computer 84 has been illustrated, the technique of the present disclosure is not limited thereto, and a device including an ASIC, an FPGA, and/or a PLD may be applied instead of the computer 84. Alternatively, a combination of a hardware configuration and a software configuration may be used instead of the computer 84.

As a hardware resource that executes the cartridge memory-side processing, various processors described below can be used. Examples of the processors include a CPU that is a general-purpose processor configured to execute software, that is, a program to function as the hardware resource that executes the cartridge memory-side processing. Examples of the processors include a dedicated electric circuit that is a processor, such as an FPGA, a PLD, or an ASIC, having a circuit configuration dedicatedly designed for executing specific processing. A memory is incorporated in or connected to any processor, and any processor uses the memory to execute the cartridge memory-side processing.

The hardware resource that executes the cartridge memory-side processing may be configured with one of various processors or may be configured with a combination of two or more processors (for example, a combination of a plurality of FPGAs or a combination of a CPU and an FPGA) of the same type or different types. The hardware resource that executes the cartridge memory-side processing may be one processor.

As an example where the hardware resource is configured with one processor, first, there is a form in which one processor is configured with a combination of one or more CPUs and software, and the processor functions as the hardware resource that executes the cartridge memory-side processing. Second, as represented by SoC or the like, there is a form in which a processor that realizes all functions of a system including a plurality of hardware resources, which execute the cartridge memory-side processing, with one IC chip is used. In this way, the cartridge memory-side processing is realized using one or more of various processors described above as the hardware resource.

In addition, as the hardware structures of various processors, more specifically, an electric circuit into which circuit elements, such as semiconductor elements, are combined can be used. The above-described cartridge memory-side processing is merely an example. Accordingly, it is needless to say that unnecessary steps may be deleted, new steps may be added, or a processing order may be changed without departing from the gist.

The content of the above description and the content of the drawings are detailed description of portions according to the technique of the present disclosure, and are merely examples of the technique of the present disclosure. For example, the above description relating to configuration, function, operation, and advantageous effects is description relating to configuration, function, operation, and advantageous effects of the portions according to the technique of the present disclosure. Thus, it is needless to say that unnecessary portions may be deleted, new elements may be added, or replacement may be made to the content of the above description and the content of the drawings without departing from the gist of the technique of the present disclosure. Furthermore, to avoid confusion and to facilitate understanding of the portions according to the technique of the present disclosure, description relating to common technical knowledge and the like that does not require particular description to enable implementation of the technique of the present disclosure is omitted from the content of the above description and the content of the drawings.

In the specification, "A and/or B" is synonymous with "at least one of A or B". That is, "A and/or B" may refer to A alone, B alone, or a combination of A and B. Furthermore, in the specification, a similar concept to "A and/or B" applies to a case in which three or more matters are expressed by linking the matters with "and/or".

All cited documents, patent applications, and technical standards described in the specification are incorporated by reference in the specification to the same extent as in a case where each individual cited document, patent application, or technical standard is specifically and individually indicated to be incorporated by reference.

What is claimed is:

1. A noncontact communication medium comprising:
a processor; and
a memory incorporated in or connected to the processor,
wherein the noncontact communication medium performs noncontact communication with an external communication device,
the memory has a storage block where information regarding an attribute of the noncontact communication medium is stored and that includes a plurality of storage fields,
the plurality of storage fields include a specification-independent storage field where information independent of a specification of a magnetic tape cartridge, in which the noncontact communication medium is mounted, is stored, and
the processor is configured to:
write accompanying information regarding the magnetic tape cartridge in the specification-independent storage field in response to an instruction given from the external communication device to the noncontact communication medium by the noncontact communication,
lock an area in the storage block where a write-in is performed, in a basic information amount unit, and
change the basic information amount unit to limitless in a case where a flag indicating limitation to change of the basic information amount unit is not set.

2. The noncontact communication medium according to claim 1,
wherein the processor is configured to:
change the basic information amount unit with a current value of the basic information amount unit as a lower limit in a case where the flag is set.

3. The noncontact communication medium according to claim 2,
wherein the flag is not switched from a set state to a non-set state after being switched from the non-set state to the set state.

4. The noncontact communication medium according to claim 1,
wherein the processor is configured to lock an area in the storage block where the write-in of a value other than an initial value is performed.

5. The noncontact communication medium according to claim 4,
wherein the processor is configured to perform write-in in order from a head address of the storage block, and
the area is an area that is specified from an address in the storage block where the write-in of the value other than the initial value is performed.

6. The noncontact communication medium according to claim 1,
wherein the processor is configured to lock the area to generate a readout-dedicated area.

7. The noncontact communication medium according to claim 1,
wherein the plurality of storage fields include a specification-dependent storage field where information dependent on the specification is stored, and the specification-independent storage field, and
the specification-dependent storage field is a readout-dedicated storage field.

8. The noncontact communication medium according to claim 7,
wherein the specification-dependent storage field has an identifier storage field where an identifier capable of specifying the noncontact communication medium is stored, an error detection code storage field where an error detection code for information including the identifier is stored, a storage capacity-related information storage field where information regarding a storage capacity of the memory is stored, and a model-related information storage field where information regarding a model of the noncontact communication medium is stored.

9. The noncontact communication medium according to claim 1,
wherein the accompanying information is different in content for each request given to the magnetic tape cartridge.

10. A magnetic tape cartridge comprising:
the noncontact communication medium according to claim 1; and
a magnetic tape,
wherein the memory stores management information regarding the magnetic tape.

11. A noncontact communication medium, comprising:
a processor; and
a memory incorporated in or connected to the processor,
wherein the noncontact communication medium performs noncontact communication with an external communication device,
wherein the memory has a storage block where information regarding an attribute of the noncontact communication medium is stored and that includes a plurality of storage fields, wherein the plurality of storage fields include a specification-independent storage field where information independent of a specification of a magnetic tape cartridge, in which the noncontact communication medium is mounted, is stored, wherein the processor is configured to:
write accompanying information regarding the magnetic tape cartridge in the specification-independent storage field in response to an instruction given from the external communication device to the noncontact communication medium by the noncontact communication, and lock an area in the storage block where a write-in is performed, in a basic information amount unit, and wherein the basic information amount unit is a byte unit.

12. A noncontact communication medium, comprising:
a processor; and
a memory incorporated in or connected to the processor,
wherein the noncontact communication medium performs noncontact communication with an external communication device,
wherein the memory has a storage block where information regarding an attribute of the noncontact communication medium is stored and that includes a plurality of storage fields,
wherein the plurality of storage fields include a specification-independent storage field where information independent of a specification of a magnetic tape cartridge, in which the noncontact communication medium is mounted, is stored,
wherein the processor is configured to write accompanying information regarding the magnetic tape cartridge in the specification-independent storage field in response to an instruction given from the external communication device to the noncontact communication medium by the noncontact communication, and
wherein the specification-independent storage field has a type-dependent storage field where information dependent on a type of the noncontact communication medium is stored, and a type-independent storage field where information independent of the type is stored, and
the processor is configured to write the accompanying information only in the type-independent storage field.

13. A method for operating a noncontact communication medium that includes a memory incorporated in or connected to a processor and performs noncontact communication with an external communication device,
in which the memory has a storage block where information regarding an attribute of the noncontact communication medium is stored and that includes a plurality of storage fields, and
the plurality of storage fields include a specification-independent storage field where information independent of a specification of a magnetic tape cartridge, in which the noncontact communication medium is mounted, is stored,
the method comprising:
writing accompanying information regarding the magnetic tape cartridge in the specification-independent storage field in response to an instruction given from the external communication device to the noncontact communication medium by the noncontact communication,
locking an area in the storage block where a write-in is performed, in a basic information amount unit, and
changing the basic information amount unit to limitless in a case where a flag indicating limitation to change of the basic information amount unit is not set.

14. A non-transitory computer-readable storage medium storing a program executable by a computer, which is applied to a noncontact communication medium that includes a memory incorporated in or connected to a processor and performs noncontact communication with an external communication device, to perform a process,
in which the memory has a storage block where information regarding an attribute of the noncontact communication medium is stored and that includes a plurality of storage fields, and
the plurality of storage fields include a specification-independent storage field where information independent of a specification of a magnetic tape cartridge, in which the noncontact communication medium is mounted, is stored,
the process comprising:
writing accompanying information regarding the magnetic tape cartridge in the specification-independent storage field in response to an instruction given from the external communication device to the noncontact communication medium by the noncontact communication,
locking an area in the storage block where a write-in is performed, in a basic information amount unit, and
changing the basic information amount unit to limitless in a case where a flag indicating limitation to change of the basic information amount unit is not set.

* * * * *